(12) United States Patent
Jiang

(10) Patent No.: US 9,524,048 B2
(45) Date of Patent: Dec. 20, 2016

(54) THREE-DIMENSIONAL (3D) INTERACTIVE METHOD AND SYSTEM

(71) Applicant: SuperD Co. Ltd., Shenzhen (CN)

(72) Inventor: Lingfeng Jiang, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 184 days.

(21) Appl. No.: 14/566,645

(22) Filed: Dec. 10, 2014

(65) Prior Publication Data

US 2015/0249819 A1    Sep. 3, 2015

(30) Foreign Application Priority Data

Mar. 3, 2014   (CN) .......................... 2014 1 0075757

(51) Int. Cl.
```
G06T 15/00      (2011.01)
G06F 3/041      (2006.01)
G06F 3/038      (2013.01)
G06F 3/0346     (2013.01)
G06F 3/03       (2006.01)
G06F 3/042      (2006.01)
G06F 3/043      (2006.01)
G06F 3/0354     (2013.01)
```
(52) U.S. Cl.
CPC .......... *G06F 3/0412* (2013.01); *G06F 3/0325* (2013.01); *G06F 3/0346* (2013.01); *G06F 3/0386* (2013.01); *G06F 3/03545* (2013.01); *G06F 3/042* (2013.01); *G06F 3/043* (2013.01); *G06F 2203/04101* (2013.01); *G06F 2203/04106* (2013.01); *G06F 2203/04108* (2013.01); *G06F 2203/04808* (2013.01)

(58) Field of Classification Search
None
See application file for complete search history.

(56) References Cited

U.S. PATENT DOCUMENTS

2008/0309641 A1*  12/2008  Harel ................... G06F 3/0418
                                                    345/173
2011/0155479 A1*  6/2011  Oda ..................... G06F 3/03545
                                                    178/18.06

(Continued)

FOREIGN PATENT DOCUMENTS

CN           101398720 A         4/2009

*Primary Examiner* — Kee M Tung
*Assistant Examiner* — Frank Chen
(74) *Attorney, Agent, or Firm* — Anova Law Group, PLLC

(57) ABSTRACT

A three-dimensional (3D) interactive method between a 3D interactive input device including multiple first nodes and a 3D display device including at least three second nodes is provided. The method includes receiving a start command from a user and controlling signal transmission devices to transmit position detection signals using different channel resources based on the received start command. The method also includes determining 3D spatial position coordinates of the first nodes relative to a specific surface based on a starting time point of the start command, ending time points, and 3D spatial position coordinates of the second nodes relative to the specific surface. Further, the method includes rebuilding 3D contour of the 3D interactive input device to determine gestures of the 3D interactive input device and implement a 3D interactive process based on the 3D spatial position coordinates of at least two first nodes relative to the specific surface.

16 Claims, 10 Drawing Sheets

(56) References Cited

U.S. PATENT DOCUMENTS

| | | | |
|---|---|---|---|
| 2014/0009384 A1* | 1/2014 | Valik | G06F 3/0304 |
| | | | 345/156 |
| 2014/0085271 A1* | 3/2014 | Hwang | G06F 3/046 |
| | | | 345/179 |
| 2016/0210039 A1* | 7/2016 | Suggs | G06F 3/0421 |

* cited by examiner

THREE-DIMENSIONAL (3D) INTERACTIVE METHOD AND SYSTEM

CROSS-REFERENCES TO RELATED APPLICATIONS

This application claims priority to Chinese Patent Application No. 201410075757.7, filed on Mar. 3, 2014, the entire content of which is incorporated herein by reference.

FIELD OF THE INVENTION

The present disclosure generally relates to the field of three-dimensional (3D) interactive technologies and, more particularly, relates to 3D interactive methods and systems.

BACKGROUND

In stereoscopic display (also called three-dimensional display) technologies, human-computer interaction for a user is not restricted to two-dimensional space. In order to achieve sense of reality, interaction in three-dimensional (3D) scales must be combined closely with visual effects.

In order to realize a more realistic interactive process between a 3D interactive input device (or other devices) and virtual 3D display contents, spatial positions and gestures of the 3D interactive input device relative to a 3D display device need to be acquired. At the same time, contour of the 3D interactive input device also needs to be acquired for realizing display processing with more accurate details. However, there still exist many problems in technical solutions of existing technologies.

For example, an ultrasonic positioning device is provided in Chinese patent CN101029931 to realize technical solutions of electronic writing. However, in that disclosure, only 3D positioning of a single-node of a signal pen is provided. The disclosure does not provide solutions for contour recognition and gesture acquisition for a 3D interactive input device, channel occupancy among multiple nodes, as well as a 3D interactive operation between the signal pen and a 3D display device.

Also for example, a wireless 3D input device is provided in US patent application US2002/0084114. In that disclosure, although two ultrasonic transmitters are disposed respectively on a stylus (that is, positioning of two nodes can be realized), the following problems still exist. First, only when the tip of the stylus is pressed against an input surface, an ultrasonic sensor can be activated. Second, because the tip of the stylus needs to touch the input surface, only two dimensional (2D) positioning of that node can be realized. Third, although the positioning of two nodes of the stylus can be realized, that disclosure does not provide solutions for contour recognition and gesture acquisition for the stylus, as well as a 3D interactive operation between the stylus and a 3D display device.

Therefore, how to obtain contour, spatial positions, and gestures of the 3D interactive input device or other input devices through tracking multiple nodes, while avoiding channel occupancy among the multiple nodes, become the technical problems to be solved. The disclosed methods and systems are directed to solve one or more problems set forth above and other problems.

BRIEF SUMMARY OF THE DISCLOSURE

One aspect of the present disclosure includes a 3D interactive method between a 3D interactive input device including multiple first nodes and a 3D display device including at least three second nodes. The method includes receiving a start command from a user and controlling signal transmission devices to transmit position detection signals using different channel resources based on the received start command. The method also includes determining 3D spatial position coordinates of the first nodes relative to a specific surface based on a starting time point of the start command, ending time points, and 3D spatial position coordinates of the second nodes relative to the specific surface. Further, the method includes rebuilding contour of the 3D interactive input device to determine gestures of the 3D interactive input device and implement a 3D interactive process based on the 3D spatial position coordinates of at least two first nodes relative to the specific surface.

Another aspect of the present disclosure includes a 3D interactive system between a 3D interactive input device and a 3D display device. The system includes a signal transmission unit including multiple signal transmission devices, wherein the signal transmission devices are configured respectively on one of multiple first nodes of the 3D interactive input device and at least three second nodes of the 3D display device, and any three second nodes among the at least three second nodes are non-collinear but coplanar. The system also includes a transmission control unit configured to control signal transmission devices to transmit position detection signals using different channel resources based on a received start command and a signal receiving unit including multiple signal receiving devices, wherein when the signal transmission devices are configured on the first nodes, the signal receiving devices are configured on the second nodes; and when the signal transmission devices are configured on the second nodes, the signal receiving devices are configured on the first nodes. Further, the system includes a time recording unit configured to record a starting time point of the received start command, and corresponding ending time points at which the signal receiving devices receive the position detection signals from the signal transmission devices and a processing device configured to determine 3D spatial position coordinates of the first nodes relative to a specific surface based on the starting time point, the ending time points and 3D spatial position coordinates of the second nodes relative to the specific surface on the 3D display device, and rebuild 3D contour of the 3D interactive input device based on the 3D spatial position coordinates of at least two first nodes relative to the specific surface, such that gestures of the 3D interactive input device are determined and a 3D interactive process is implemented.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

The present disclosure can be used in a 3D interactive operating process between a 3D interactive input device and a 3D display device. Coordinates of three-dimensional (3D) spatial position of the 3D interactive input device such as spatial positions, gestures and contour information are obtained accurately through fixed-point tracking for multiple nodes on the 3D interactive input device, thereby completing accurate and detailed 3D interaction between the 3D interactive input device and 3D display contents.

In technical solutions of the present disclosure, the coordinates of 3D spatial position of the multiple nodes on the 3D interactive input device relative to the 3D display device are acquired through receiving and transmitting position detection signals. Specifically, for receiving and transmitting the position detection signals, there are two specific implementing approaches.

One approach is to configure signal transmission devices on the 3D interactive input device, and configure signal receiving devices on the 3D display device, such that a system architecture of "dynamic transmitting and static receiving" is formed.

Another approach is to configure signal transmission devices on the 3D display device, and configure signal receiving devices on the 3D interactive input device, such that a system architecture of "static transmitting and dynamic receiving" is formed. The two approaches or modes are described in detail below.

Figure 1:
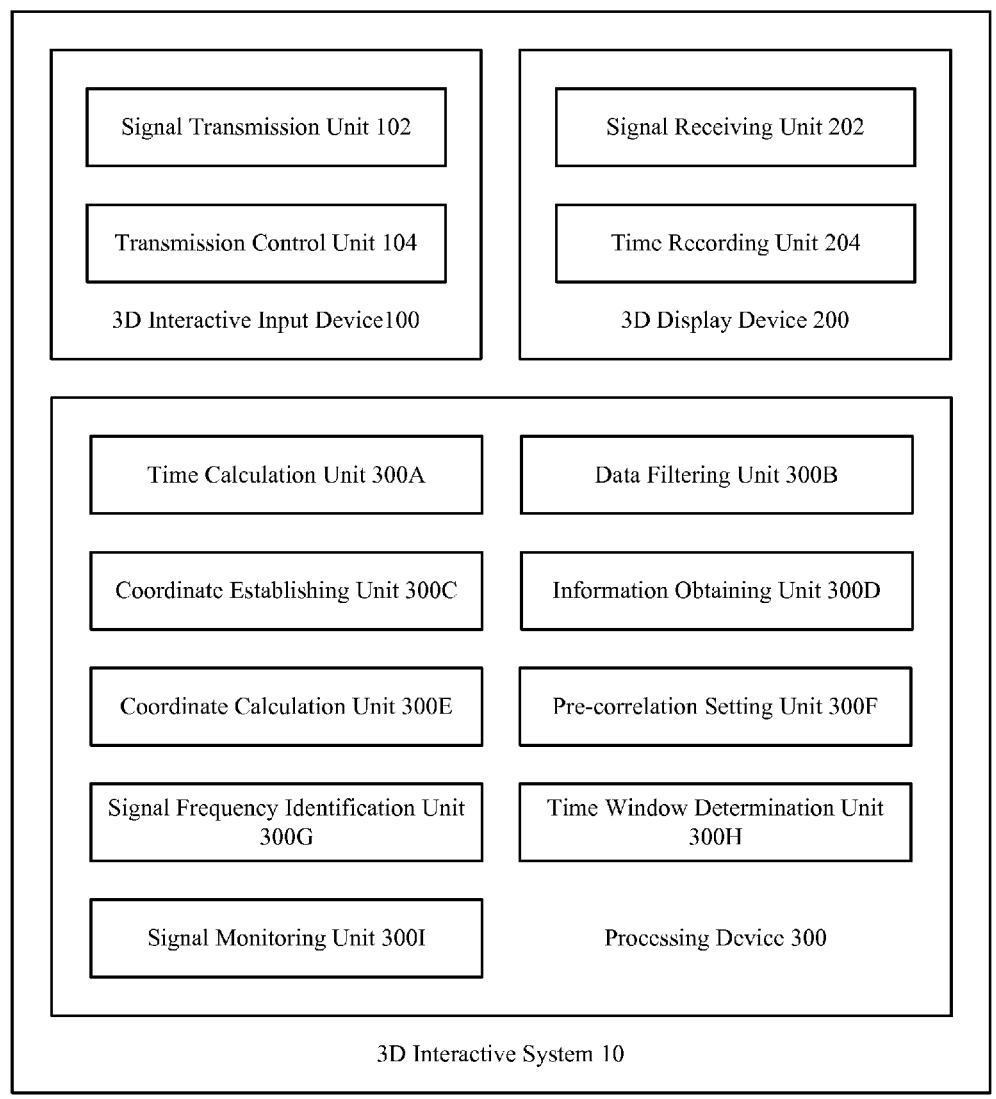
FIG. 1 illustrates a block diagram of an exemplary 3D interactive system consistent with the disclosed embodiments.

For the system architecture of "dynamic transmitting and static receiving", FIG. 1 illustrates a block diagram of an exemplary 3D interactive system consistent with the disclosed embodiments.

As shown in FIG. 1, a 3D interactive system 10 may include a 3D interactive input device 100, a 3D display device 200, and a processing device 300. The 3D interactive system 10 is configured to perform a 3D interactive operating process between the 3D interactive input device 100 and the 3D display device 200.

The 3D interactive input device 100 may include a signal transmission unit 102 and a transmission control unit 104. The signal transmission unit 102 includes signal transmission devices respectively configured on multiple first nodes of the 3D interactive input device 100. The first nodes are physical points on the surface of the 3D interactive input device 100. The contour of the 3D interactive input device can be acquired by determining 3D spatial positions of the first nodes.

The transmission control unit 104 is configured to control every signal transmission device to transmit a position detection signal using the corresponding channel resource according to a received start command. A user may send the start command to the transmission control unit 104 by performing a corresponding operation (for example, an icon-click operation). The channel resources include different frequency sub-bands corresponding to the signals for a frequency-division transmission technique (that is, each frequency sub-band is used to carry a separate signal for a frequency-division transmission technique), different time slots (i.e., time interval) corresponding to the signals for a time-division transmission technique, and independent time slots of the frequency sub-bands corresponding to the signals for a combined frequency-division and time-division transmission technique.

The 3D display device 200 may include a signal receiving unit 202 and a time recording unit 204. The signal receiving unit 202 includes signal receiving devices configured on at least three second nodes of the 3D display device 200 (any three second nodes are non-collinear but coplanar). The second nodes are physical points on the surface of the 3D interactive display device 200. The time recording unit 204 is configured to record a starting time point at which the 3D interactive input device 100 receives the start command, and a corresponding ending time point at which every signal receiving device receives the position detection signal from every signal transmission device.

The processing device 300 is configured to determine 3D spatial position coordinates of each first node relative to a specific surface based on the starting time point, the ending time point and the 3D spatial position coordinates of each second node relative to the specific surface on the 3D display device 200, and rebuild 3D contour of the 3D interactive input device 100 based on the 3D spatial position coordinates of the at least two first nodes relative to the specific surface, such that gestures of the 3D interactive input device 100 can be determined and the 3D interactive operating process can be implemented.

Through utilizing different channel resources among various signal transmission devices, the source of the position detection signal received by every signal receiving device can be recognized accurately, thereby avoiding confusion between the channel resources caused by the increasing of the number of the first nodes and helping to improve the success rate and accuracy of multi-point position tracking.

After the 3D spatial position coordinates of every first node are obtained, through extending lines (i.e., straight lines or lines with other preset shapes) between multiple first nodes (for example, operations between any two adjacent first nodes, or operations based on a pre-correlation between every first nodes), the 3D contour of the 3D interactive input device 100 can be obtained. At the same time, because the 3D spatial position coordinates of the first nodes are defined based on the specific surface of the 3D display device 200, the 3D contour of the 3D interactive input device 100 is allowed to correlate with the 3D display device 200, so that gesture information of the 3D interactive input device 100 relative to the specific surface (that is, the 3D display device 200 or the 3D display contents of the 3D display device 200) can be determined, further the 3D interactive operation between the 3D interactive input device 100 and the 3D display contents of the 3D display device 200 can be realized more elaborately to improve user experience.

The 3D interactive input device 100 can be a 3D structure with any shape and size. The 3D interactive input device 100 can be a simple structure such as a pen shape or a rod shape. The 3D interactive input device 100 can also be a complex structure such as a knife shape, a gun shape or a magic wand shape. If a sufficient number of nodes are configured on the 3D interactive input device 100, the contour and gesture recognition for any structure can be realized accurately, further realizing the accurate and detailed 3D interactive operation.

The signal transmission unit 102 may further include a start signal transmitting end configured on the 3D interactive input device 100. The signal receiving unit 202 further includes a start signal receiving end configured on the 3D display device 200. The time recording unit 204 is configured to, when the start signal receiving end receives the start signal sent by the start signal transmitting end, confirm that the start command is received and record the corresponding starting time point.

Transmission of the start signal allows all signal receiving devices to start counting time at the same time, realizing synchronization among all the signal receiving devices. Further, based on the length of time for every signal receiving device receiving the position detection signal, every distance between every signal transmission device and every signal receiving device (that is, between the first node and the second node) can be calculated, realizing accurate position tracking for every first node.

The transmission speed of the start signal is faster than the transmission speed of the position detection signal, such that detection of transmission time of the position detection signal is not affected by the transmission of the start signal, ensuring the accurate position tracking for every first node. In order to meet the above speed relationship, the position detection signal may be an ultrasonic wave signal and the start signal may be an infrared signal, an electrical signal or a radio signal.

Of course, through obtaining the transmission speed of the start signal in advance, even though the transmission speed of the start signal is relatively slow, the accurate position tracking for every first node can still be realized through compensating the transmission time of the position detection signal during the calculation process.

Figure 2A:
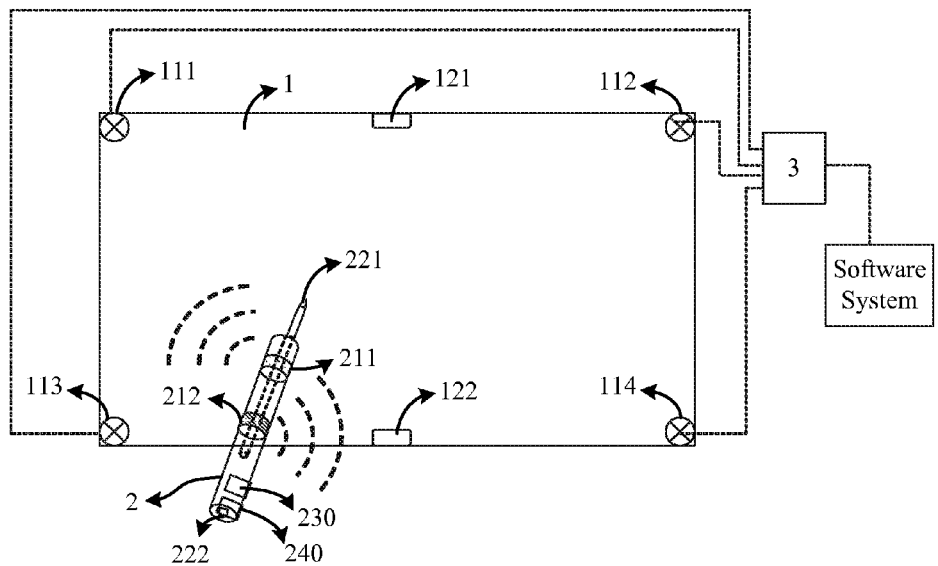
FIG. 2A illustrates a schematic diagram of an exemplary 3D interactive system consistent with the disclosed embodiments.

FIG. 2A illustrates a schematic diagram of an exemplary 3D interactive system consistent with the disclosed embodiments. As shown in FIG. 2A, a 3D display device may include a display surface 1, a signal processor 3 and a software system. The 3D interactive operation is realized by using the 3D display device and a 3D interactive operation rod 2. The 3D interactive operation rod is used for illustrative purposes, and any other type of 3D interactive input device may be used.

A transmission system is configured on the 3D interactive operation rod 2, and a receiving system is configured on the display surface 1. The software system of the 3D display device (together with the corresponding processor) forms a processing system. The details for each system are described as follows.

The transmission system includes ultrasonic transmitters 211 and 212, infrared (IR) transmitters 221 and 222, a control module 230 and a communication module 240 that are configured on the 3D interactive operation rod 2.

The ultrasonic transmitters 211 and 212 are respectively configured at two different nodes of the 3D interactive operation rod 2. The ultrasonic transmitters 211 and 212 are configured to transmit ultrasonic wave signals, respectively. Of course, when the shape is more complicated or the precision requirements are higher, more nodes can be selected to configure more ultrasonic transmitters (not shown in FIG. 2A). The number of the nodes and the ultrasonic transmitters are not limited herein.

The IR transmitters 221 and 222 can be configured at any position of the 3D interactive operation rod 2, for example, at both ends of the 3D interactive operation rod 2. On one hand, the IR transmitters can be configured at any position of the 3D interactive operation rod 2; on the other hand, the number of the IR transmitters can be one or more. Synchronization for receiving the ultrasonic wave signals can be realized through the infrared transmission. Therefore, the position and the number of the IR transmitters are not limited herein.

The control module 230 is configured to control signal transmission of the ultrasonic transmitters 211 and 212 and the IR transmitters 221 and 222. The communication module 240 is configured to communicate with the 3D display device.

Further, the receiving system includes ultrasonic receivers 111, 112, 113 and 114, infrared (IR) receivers 121 and 122, and a signal processor 3 that are configured on the display surface 1.

The ultrasonic receivers 111, 112, 113 and 114 are configured on the display surface 1. The display surface 1 can be a screen surface of the 3D display device. The number of the ultrasonic receivers can be 3, 4, or more. The number of the ultrasonic receivers is not limited herein. When all the ultrasonic receivers are non-collinear, the ultrasonic receivers can be configured at any position of the display surface 1.

The IR receivers 121 and 122 are configured on the display surface 1. The IR receivers 121 and 122 are configured to receive infrared rays transmitted by the IR transmitters 221 and 222.

The signal processor 3 is configured to amplify and process the ultrasonic wave signals received by the ultrasonic receivers 111, 112, 113 and 114, to obtain corresponding transmission time of the ultrasonic wave signals, and to convert the corresponding transmission time of the ultrasonic wave signals to spatial position coordinates of the ultrasonic transmitters on the 3D interactive operation rod 2 relative to the display surface 1.

Figure 2B:
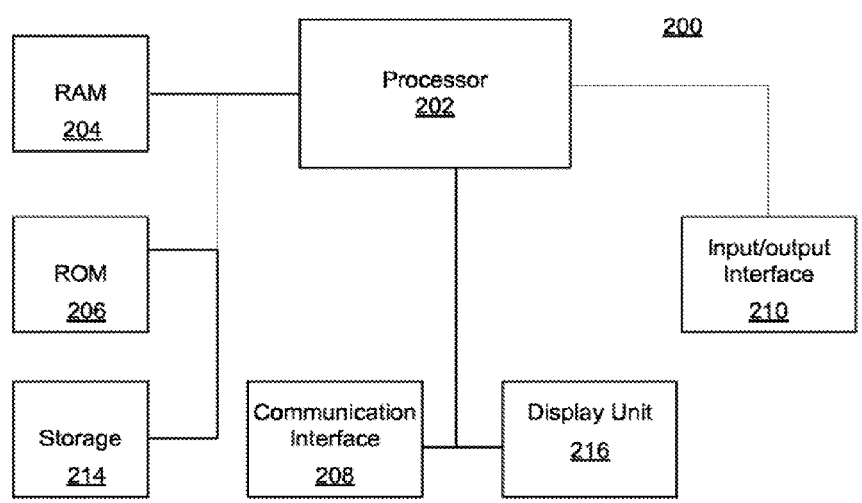
FIG. 2B illustrates a block diagram of a computing platform implementing various modules of 3D interactive display system.

The processing system includes the software system shown in FIG. 2A, as well as corresponding processor for executing the software system. The software system may be a computing platform. FIG. 2B illustrates a block diagram of a computing platform 200 implementing various modules of 3D interactive system 10.

As shown in FIG. 2B, computing platform 200 may include a processor 202, a random access memory (RAM) unit 204, a read-only memory (ROM) unit 206, a communication interface 208, an input/output interface unit 210, a storage unit 214, and a display unit 216. Other components may be added and certain devices may be removed without departing from the principles of the disclosed embodiments.

Processor 202 may include any appropriate type of graphic processing unit (GPU), general purpose microprocessor, digital signal processor (DSP) or microcontroller, and application specific integrated circuit (ASIC). Processor 202 may execute sequences of computer program instructions to perform various processes associated with computing platform 200. The computer program instructions may be loaded into RAM 204 for execution by processor 202 from read-only memory 206.

Communication interface 208 may provide communication connections such that computing platform 200 may be accessed remotely and/or communicate with other systems through computer networks or other communication networks via various communication protocols, such as transmission control protocol/internet protocol (TCP/IP), hypertext transfer protocol (HTTP).

Input/output interface 210 may be provided for users to input information into computing platform 200 or for the users to receive information from computing platform 200. For example, input/output interface 210 may include any appropriate input device, such as a remote control, a keyboard, a mouse, an electronic tablet, voice communication devices, or any other optical or wireless input devices. Storage unit 214 may include any appropriate type of storage medium, such as a CD-ROM, a hard disk, a flash drive, an optical storage, a DVD drive, or other type of storage devices. Further, display unit 216 may include any appropriate display screen.

During operation, 3D interactive system 10, or processor 202 of computing platform 200 implementing the various modules of 3D interactive system 10, may perform certain processes to display 3D image to one or more users.

The processing system is configured to acquire the spatial position coordinates of the ultrasonic transmitters on the 3D interactive operation rod 2 relative to the display surface 1, and to integrate the spatial position coordinates of the ultrasonic transmitters into a coordinate system of the display screen of the 3D display device to obtain gestures of the 3D interactive operation rod 2. Further, the processing system is also configured to process other operations in the 3D interactive process.

The processing system may be implemented in various ways.

As an example, as shown in FIG. 1, the processing device 300 may be configured in the 3D interactive input device 100. That is, the processing system shown in FIG. 2A can be constituted by the control module 230 in the 3D interactive operation rod 2.

Specifically, the signal processor 3 records the time point at which each ultrasonic receiver (corresponding to every node on the 3D interactive input device 100) receives the ultrasonic wave signal, and sends the time point to the control module 230. The control module 230 calculates transmission time of the ultrasonic wave signal transmitted by every ultrasonic transmitter and converts the transmission time to a distance between every ultrasonic transmitter and the corresponding ultrasonic receiver on the display surface 1.

Further, the control module 230 calculates the spatial position coordinates of each node on the 3D interactive operation rod 2. Further, the control module 230 integrates the spatial position coordinates of each node into the coordinate system of the display screen of the 3D display device, such that the 3D spatial position coordinates of the 3D interactive operation rod 2 can be obtained. Or, the control module 230 sends the spatial position coordinates of each node to the software system, and the software system integrates the spatial position coordinates of each node into the coordinate system of the display screen of the 3D display device.

As another example, the processing device 300 shown in FIG. 1 may also be configured in the 3D display device 200. That is, the processing system shown in FIG. 2A can be constituted by the signal processor 3 in the display device.

Specifically, the signal processor 3 records the time point at which each ultrasonic receiver (corresponding to every node on the 3D interactive input device 100) receives the corresponding ultrasonic wave signal and calculates the spatial position coordinates of each node on the 3D interactive operation rod 2. Further, the signal processor 3 integrates the spatial position coordinates of each node into the coordinate system of the display screen of the 3D display device, such that the 3D spatial position coordinates of the 3D interactive operation rod 2 can be obtained. Or, the signal processor 3 sends the spatial position coordinates of each node to the software system, and the software system integrates the spatial position coordinates of each node into the coordinate system of the display screen of the 3D display device.

As yet another example, the processing device 300 shown in FIG. 1 may also be configured outside the 3D display device 200 and the 3D interactive input device 100. That is, the processing system shown in FIG. 2A is constituted by an independent processing device (not shown).

Specifically, the signal processor 3 records the time point at which each ultrasonic receiver (corresponding to every node on the 3D interactive input device 100) receives the ultrasonic wave signal, and sends the time point to the processing device. Then, the processing device calculates the spatial position coordinates of each node on the 3D interactive operation rod 2. Further, the processing device integrates the spatial position coordinates of each node into the coordinate system of the display screen of the 3D display device based on the spatial position coordinates of each node, such that the 3D spatial position coordinates of the 3D interactive operation rod 2 can be obtained. Or, the processing device sends the spatial position coordinates of each node to the software system, and the software system integrates the spatial position coordinates of each node into the coordinate system of the display screen of the 3D display device.

Figure 3:
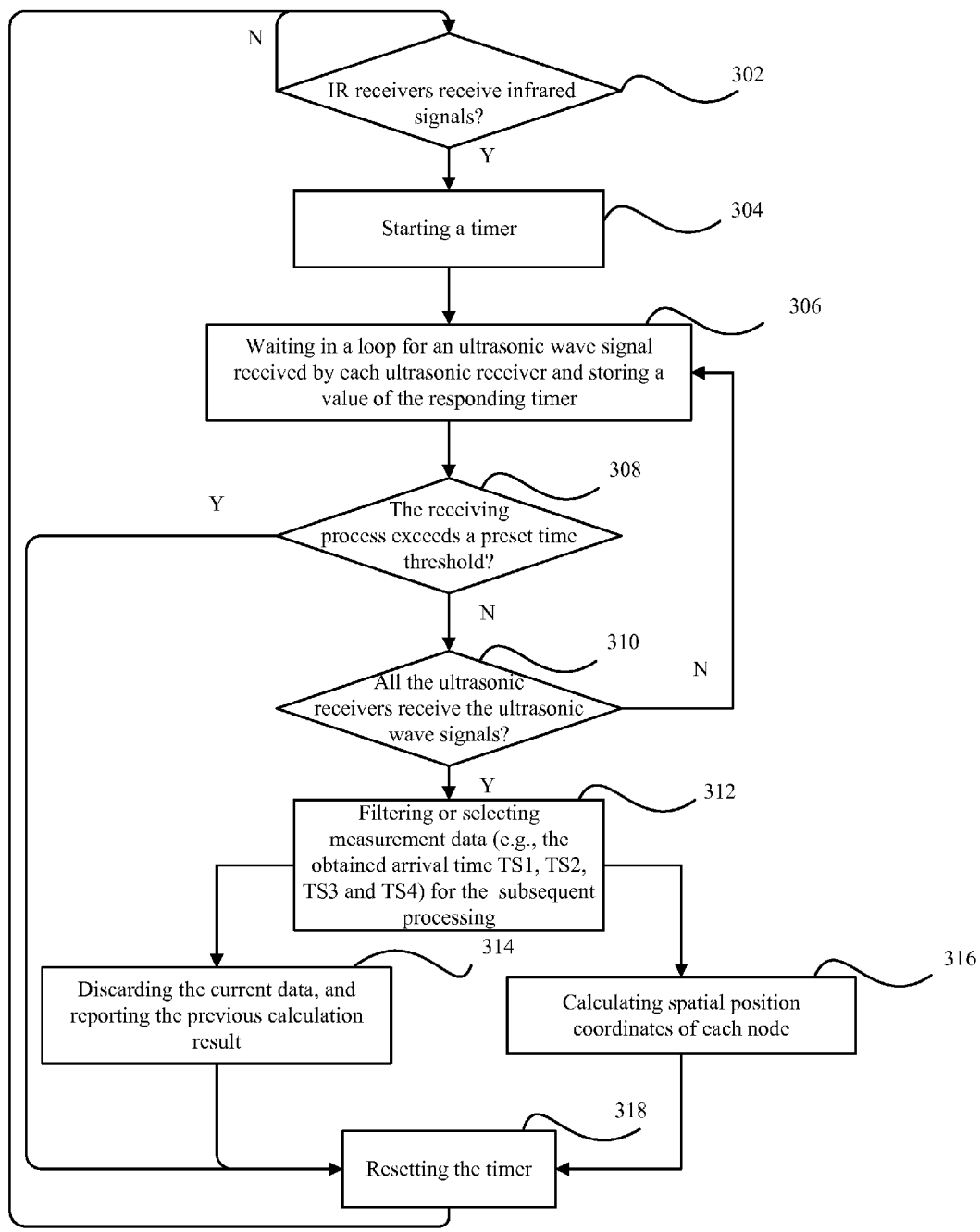
FIG. 3 illustrates a flow chart of an exemplary process for fixed-point tracking for a single-node consistent with the disclosed embodiments.

In connection with the signal transmission among the transmission system, the receiving system and the processing system, FIG. 3 illustrates a flow chart of an exemplary process for fixed-point tracking for a single node consistent with the disclosed embodiments. A user may send a start command to call the process by performing a corresponding operation (for example, an icon-click operation). As shown in FIG. 3, the process may include the following steps.

Step 302: determining whether IR receivers (e.g., IR receiver 121 and IR receiver 122 shown in FIG. 2A) receive infrared signals transmitted by IR transmitters (e.g., IR transmitter 221 and IR transmitter 222 shown in FIG. 2A). If the IR receivers receive the infrared signals from the IR transmitters, the process goes to Step 304; otherwise, the system continues to wait.

Specifically, ultrasonic transmitters and IR transmitters configured on an object (e.g., a 3D interactive operation rod 2) to be tracked can transmit periodically the ultrasonic wave signals and the infrared signals at the same time. The duration of the signals is 500-1000 milliseconds. Because the speed of the infrared signal is the same as the speed of the light, the infrared signal is considered to arrive instantaneously. Therefore, the infrared signal can be used as a timing synchronization signal for the arrival time.

Step 304: a timer is started. Specifically, the signal processor 3 shown in FIG. 2A can turn on/off the timer and record timer data.

Step 306: waiting in a loop for each ultrasonic receiver to receive the ultrasonic wave signal and storing the corresponding timer value.

Specifically, the process starts when the IR receivers receive the infrared signals, and the process completes when the ultrasonic receivers receive the ultrasonic wave signals transmitted by the nodes. The arrival time TS1, TS2, TS3 and TS4 (4 ultrasonic receivers shown in FIG. 2A are used herein as an example) of the ultrasonic wave signals corresponding to the ultrasonic receivers are obtained. Under the same conditions, a distance between one ultrasonic transmitter and the corresponding ultrasonic receiver is proportional to the corresponding arrival time. That is, the distances between the ultrasonic transmitter and the ultrasonic receivers 111, 112, 113 and 114 are proportional to the arrival time TS1, TS2, TS3 and TS4, respectively.

Step 308: whether the receiving process exceeds a preset time threshold is determined. If the receiving process exceeds the preset time threshold, the timer is reset to 0; otherwise, the process goes to Step 310.

Step 310: whether all the ultrasonic receivers receive the ultrasonic wave signals is determined. If all the ultrasonic receivers receive the ultrasonic wave signals, the process goes to Step 312; otherwise, the process goes to Step 306.

Step 312: measurement data, e.g., the obtained arrival time TS1, TS2, TS3 and TS4, is filtered or selected for subsequent processing.

Step 314: if the corresponding spatial position coordinates cannot be calculated, the current data is discarded, and the previous calculation result is reported.

Step 316: if the corresponding spatial position coordinates can be calculated, a normal calculation operation is performed to obtain the spatial position coordinates of the node corresponding to each ultrasonic transmitter.

Step 318: the timer is reset to 0 and the process goes back to Step 302.

Figure 4:
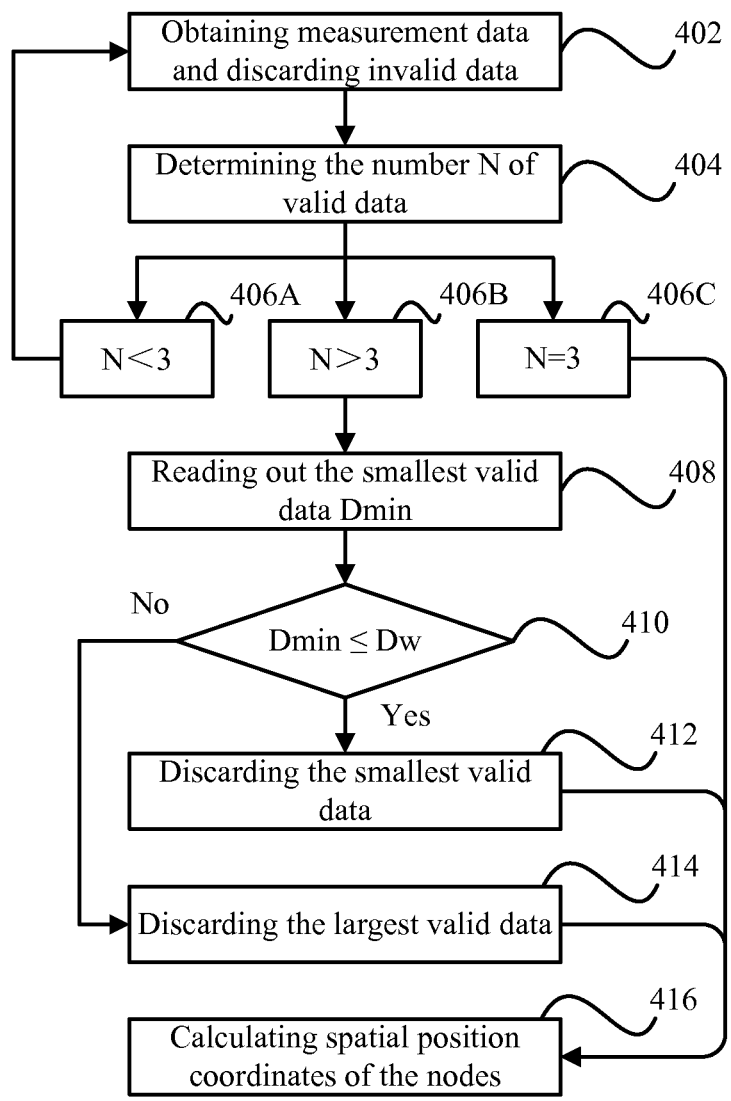
FIG. 4 illustrates a flow chart of an exemplary process for selecting measurement data consistent with the disclosed embodiments.

The measurement data selection or filtering may be performed in various ways to ensure data accuracy and/or validity. FIG. 4 illustrates a flow chart of an exemplary process for selecting measurement data consistent with the disclosed embodiments. As shown in FIG. 4, the process may include the following steps.

Step 402: measurement data corresponding to each ultrasonic transmitter is obtained. For example, the arrival time of the ultrasonic wave corresponding to each ultrasonic receiver (i.e., transmission time of the ultrasonic wave signal. In other words, the arrival time of the ultrasonic wave refers to the length of time during which ultrasonic wave is transmitted from the ultrasonic transmitter and received by the ultrasonic receiver) such as TS1, TS2, TS3 and TS4 are obtained. At the same time, invalid data in the measurement data needs to be excluded.

Specifically, because the area of display surface 1 (shown in FIG. 2A) of the 3D display device is limited, the arrival time of the ultrasonic wave is within a preset fixed range. The measurement data beyond the preset range is determined as invalid data. At the same time, the measurement data without reading due to other abnormal situations is also determined as invalid data.

Step 404: the number of remaining valid data N is determined.

Step 406A: if the number N of valid data is less than 3, the spatial position coordinates of the corresponding ultrasonic transmitter (that is, the node corresponding to the ultrasonic transmitter) cannot be calculated, and the current data is discarded. The process goes back to Step 402 to wait for obtaining the next measurement data.

Step 406B: if the number N of valid data is greater than 3 (for example, TS1, TS2, TS3 and TS4 in the above situations), it indicates that there are valid data for all the four ultrasonic receivers, and the process goes to Step 408.

Step 406C: if the number N of valid data is equal to 3, the process jumps to Step 416.

Step 408: the smallest valid data Dmin among all the valid data is read out. For example, the smallest valid data among TS1, TS2, TS3 and TS4 is read out.

Step 410: a numerical relationship between a multipath threshold distance Dw corresponding to the 3D display device and the smallest valid data Dmin is judged. If Dmin is less than or not greater than Dw, the process goes to Step 412; otherwise, the process goes to Step 414. The multipath threshold distance means a certain threshold value; when the distance between the ultrasonic transmitter and the ultrasonic receiver is less than the certain threshold value, because material on the surface of the 3D display device transmits sound, signal transmission on the display surface is faster than signal transmission in air, causing the measurement distance to be less than the real distance.

Step 412: when Dmin is less than or not greater than Dw, because the speed of sound transmission in the solid material is faster than the speed of sound transmission in air, the ultrasonic wave is transmitted to the ultrasonic receiver through the solid material, and the ultrasonic wave arrives in advance. That is, multipath effect is generated. Therefore, in order to avoid data deviation caused by the multipath effect, the smallest valid data Dmin needs to be discarded.

Step 414: in order to avoid inaccurate data caused by too weak signal when the distance is too long, the largest valid data needs to be discarded.

Step 416: based on the remaining 3 measurement values, the corresponding spatial position coordinates are calculated.

It should be noted that, in order to implement the data selecting operation shown in FIG. 4, especially to avoid adverse effect caused by the multipath effect, the corresponding function modules may be provided in the structure of the 3D interactive system 10 shown in FIG. 1.

The processing device 300 may include a time calculation unit 300A and a data filtering unit 300B. The time calculation unit 300A is configured to, based on a starting time point and an ending time point of every signal receiving device corresponding to any signal transmission device, calculate respectively signal transmission time values corresponding to every signal receiving device and any signal transmission device. The data filtering unit 300B is configured to, when the number of valid signal transmission time values is greater than 3, if the transmission distance corresponding to the smallest valid signal transmission time value is less than or equal to a preset multipath threshold distance of the 3D display device 200, filter out the smallest valid signal transmission time value.

The signal transmission time (value) refers to the length of time between the time of the signal transmission device transmitting the position detection signal and the time of the signal receiving device receiving the position detection signal. When the distance between the signal transmission device and the signal receiving device is too small (that is, the distance is less than or equal to the preset multipath threshold distance), the position detection signal may be transmitted through the solid structure of the 3D display device. For example, when the position detection signal is an ultrasonic wave signal, because the transmission speed of the ultrasonic wave in the solid material is faster than the transmission speed of the ultrasonic wave in air, the position detection signal transmitted along the solid material arrives at the signal receiving device in advance, thus the transmission time of the corresponding signal is shortened.

Therefore, through detecting the valid signal transmission time corresponding to every signal receiving device and filtering the valid signal transmission time (transmission distance is less than or equal to the preset multipath threshold distance), the error or deviation caused by the multipath effect can be effectively avoided.

Because the area of the display screen of the 3D display device 700 is limited, and the transmission speed of the position detection signal is constant, the signal transmission time corresponding to every signal receiving device is within a certain fixed preset range. Therefore, the signal transmission time within the preset range is valid signal transmission time; otherwise, the signal transmission time is invalid. Through judging whether the signal transmission time value is valid, the signal transmission time is filtered or selected, thereby improving accuracy for detecting the 3D spatial position coordinates of the 3D interactive input device 100.

At the same time, because generation of the multipath effect is related to the shape and material of the 3D interactive input device and position selection of the second node, the measurement operation needs to be performed in advance based on the specific situation of the 3D interactive input device to obtain the corresponding preset multipath threshold distance.

The data filtering unit 300B may be also configured to, if the transmission distance corresponding to the smallest valid signal transmission time value is greater than the preset multipath threshold distance, filter out the largest valid signal transmission time value.

Through filtering out the largest valid signal transmission time value, when the distance is too long, the inaccurate data access operation caused by too weak position detection signal is avoided.

With respect to spatial position coordinate calculation, a variety of algorithms may be used.

Figure 5A:
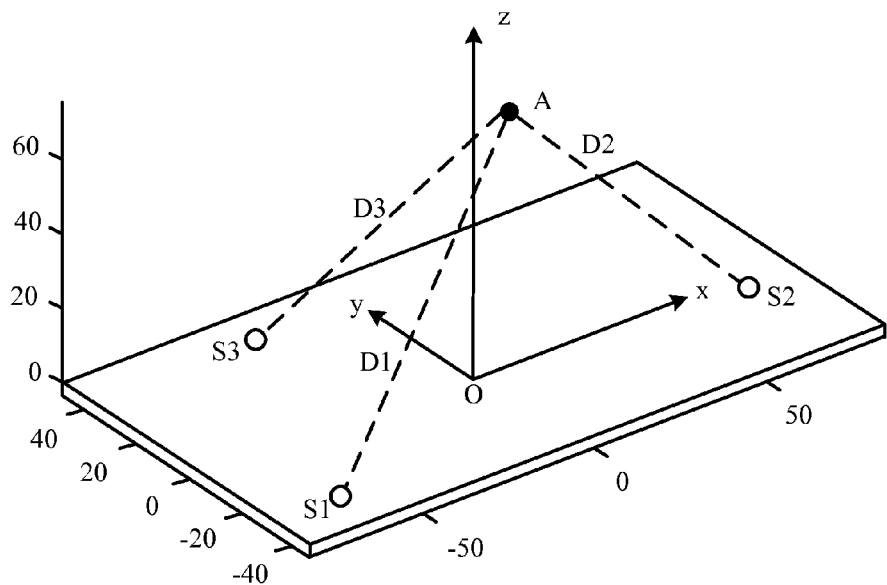
FIG. 5A illustrates a schematic diagram for calculating a spatial position of a node consistent with the disclosed embodiments.

As an example, FIG. 5A illustrates a schematic diagram for calculating a spatial position of a node consistent with the disclosed embodiments.

As shown in FIG. 5A, it is assumed that the spatial position coordinates of node A relative to the display surface of the 3D interactive display device (the surface of three points S1, S2 and S3) needs to be calculated.

Assuming that coordinates of node A are (x, y, z), after data is filtered as shown in FIG. 4, the arrival time TS1, TS2 and TS3 of the ultrasonic wave are obtained. The arrival time TS1, TS2 and TS3 correspond to the ultrasonic receivers S1, S2 and S3 on the display surface, respectively.

As shown in FIG. 5A, if the width of the display surface is w (that is, a distance between S1 and S2) and the height of the display surface is h (that is, a distance between S1 and S3), then the x axis and the y axis are respectively parallel to a S1S2 direction and a S1S3 direction, and the z axis is perpendicular to the display surface and points to a user (the user is not shown in FIG. 5). A coordinate zero point is a central point of the display surface.

Assuming that coordinates of S1, S2 and S3 are $(x_1, y_1, z_1)$, $(x_2, y_2, z_2)$ and $(x_3, y_3, z_3)$ respectively, under general conditions, $z_1 = z_2 = z_3$ can only be obtained. At the same time, the distances between node A and nodes S1, S2, and S3 are $D_1$, $D_2$ and $D_3$, respectively. $D_1$, $D_2$ and $D_3$ can be calculated based on transmission speed of the ultrasonic wave in air and the arrival time TS1, TS2 and TS3, and the following relationships exist in Equation Set (1):

$$\begin{cases} (x_1 - x)^2 + (y_1 - y)^2 + z^2 = D_1^2 \\ (x_2 - x)^2 + (y_2 - y)^2 + z^2 = D_2^2 \\ (x_3 - x)^2 + (y_3 - y)^2 + z^2 = D_3^2 \end{cases} \quad (1)$$

Based on Equation Set (1), the specific value of the spatial position coordinates of node A(x, y, z) can be obtained.

Figure 5B:
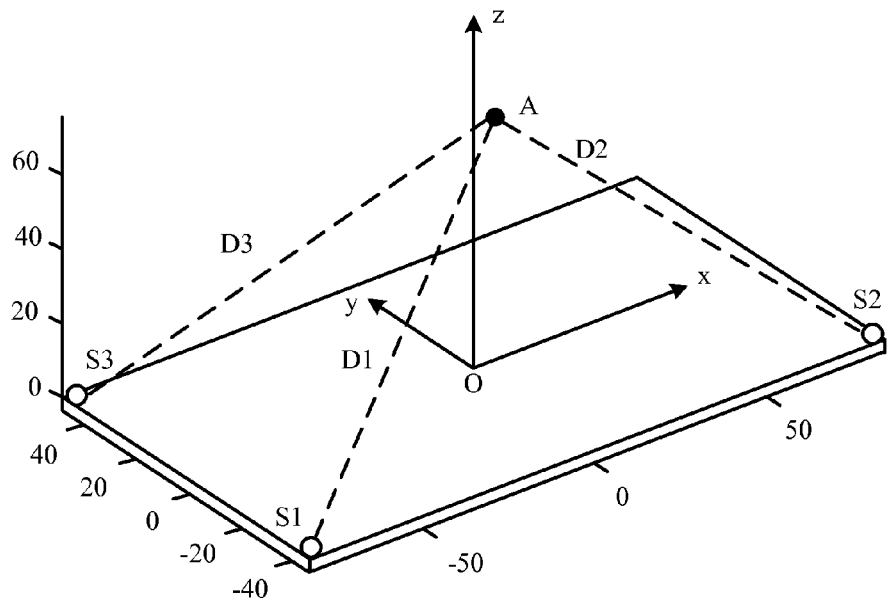
FIG. 5B illustrates a schematic diagram for calculating another spatial position of a node consistent with the disclosed embodiments.

As for another example, FIG. 5B illustrates a schematic diagram for calculating another spatial position of a node consistent with the disclosed embodiments. As shown in FIG. 5B, special arrangement is made for three nodes S1, S2 and S3 on the display surface. This can help to simplify algorithms, facilitate calculation, and reduce computational load.

Specifically, S1, S2 and S3 can be respectively configured at each vertex of the display surface, and coordinate origin O is configured at the diagonal intersection of the display surface. Thus, it is assumed that coordinates of S1, S2 and S3 are $(x_1, y_1, z_1)$, $(x_2, y_2, z_2)$, and $(x_3, y_3, z_3)$, respectively. Then, $y_1 = y_2 = -y_3 = -h/2$, $x_1 = x_3 = -x_2 = -w/2$, and $z_1 = z_2 = z_3 = 0$ are obtained. At the same time, the distances between node A and S1, S2 and S3 are $D_1$, $D_2$ and $D_3$, respectively. $D_1$, $D_2$ and $D_3$ can be calculated based on transmission speed of the ultrasonic wave in air and the arrival time TS1, TS2 and TS3, and the following relationships exist in Equation Set (2):

$$\begin{cases} x^2 + y^2 + z^2 + x_1^2 + y_1^2 + z_1^2 - 2x_1 x - 2y_1 y - 2z_1 z = D_1^2 \\ x^2 + y^2 + z^2 + x_2^2 + y_2^2 + z_2^2 - 2x_2 x - 2y_2 y - 2z_2 z = D_2^2 \\ x^2 + y^2 + z^2 + x_3^2 + y_3^2 + z_3^2 - 2x_3 x - 2y_3 y - 2z_3 z = D_3^2 \end{cases} \quad (2)$$

Equation Set (2) can be simplified as Equation Set (3):

$$\begin{cases} x^2 + y^2 + z^2 + x_1^2 + y_1^2 + z_1^2 - 2x_1 x - 2y_1 y - 2z_1 z = D_1^2 \\ -2wx = D_2^2 - D_1^2 \\ -2hy = D_3^2 - D_1^2 \end{cases} \quad (3)$$

Based on Equation Set (3), the specific value of the spatial position coordinates of node A (x, y, z) can be obtained.

As described in Step 314 in FIG. 3, if measurement errors or circuit noises affect data accuracy, then there is no solution for the above equation set. Because a sampling period for the ultrasonic wave signal is very short, a few frames of corrupted data may not cause too much impact. Thus, the previous operational data can be transmitted as a result and the corrupted data is discarded.

Therefore, for multi-node position tracking, the spatial position coordinates of every node can be calculated by using the above method, thereby obtaining the spatial position coordinates corresponding to the multiple nodes. Then, 3D spatial position coordinates of the 3D interactive input device are obtained through converting the spatial position coordinates of every node into the coordinate system of the display screen of the 3D display device, which realizes the determining and tracking of the positions, gestures and contour of the 3D interactive input device.

It should be noted that, in order to implement the spatial position coordinate calculation operation shown in FIG. 5A and FIG. 5B, the corresponding function modules may be provided in the structure of the 3D interactive system 10 shown in FIG. 1.

The processing device 300 may further include a coordinate establishing unit 300C, an information obtaining unit 300D, and a coordinate calculation unit 300E. The coordinate establishing unit 300C is configured to establish a 3D spatial coordinate system based on the specific surface. The information obtaining unit 300D is configured to obtain coordinates of each second node relative to the 3D spatial coordinate system.

The coordinate calculation unit 300E is configured to establish an equation of each second node relative to any first node by:

$$(x_n-x)^2+(y_n-y)^2+(z_n-z)^2=[(T_n-T_0)\cdot v]^2$$

wherein $(x_n, y_n, z_n)$ is coordinates of the nth second node relative to the 3D spatial coordinate system; $(x, y, z)$ represents to-be-solved parameters of the coordinates of any first node relative to the 3D spatial coordinate system; $T_n$ represents an ending time point between the nth second node and any first node; $T_0$ represents a starting time point; and v is transmission speed of the position detection signal.

The coordinate calculation unit 300E is also configured to, based on all the established equations, calculate the coordinates of any first node relative to the 3D spatial coordinate system as the 3D spatial position coordinates of any first node relative to the specific surface.

Optionally, the coordinate establishing unit 300C is also configured to, when the specific surface is a rectangular display surface of the 3D display device 200, configure the origin of the 3D spatial coordinate system at the diagonal intersection of the rectangular display surface, configure the first axis along the first side of the rectangular display surface, configure the second axis along the second side of the rectangular display surface and configure the third axis perpendicular to the rectangular display surface; wherein the first side is perpendicular to the second side, the second node is configured at the rectangular display surface, each second node has at least one symmetrical second node, and the symmetrical axis is at least one axis of the 3D spatial coordinate system.

Through appropriately configuring the 3D spatial coordinate system and the second nodes (that is, a symmetrical relationship among the second nodes), when the corresponding formula is established, the amount of calculation can be effectively reduced, thereby reducing processing demands for the corresponding hardware devices. Real-time capability of the data calculation is enhanced and the occurrence of delay during the 3D interactive operating process is reduced.

The gesture tracking and contour recognition can be considered as position tracking for geometry nodes of an object to be measured. When coordinates of the nodes of the object to be tracked are obtained, gestures and contour of the object can be tracked.

However, because every node needs to implement signal transmission, in order to effectively recognize each node and the corresponding transmission signal, and realize multiple nodes tracking at the same time, the channel occupancy problem of the signal needs to be solved.

In combination with FIGS. 6A, 6B and 6C, three specific implementation modes for solving the channel occupancy problem are described as follows.

Figure 6A:
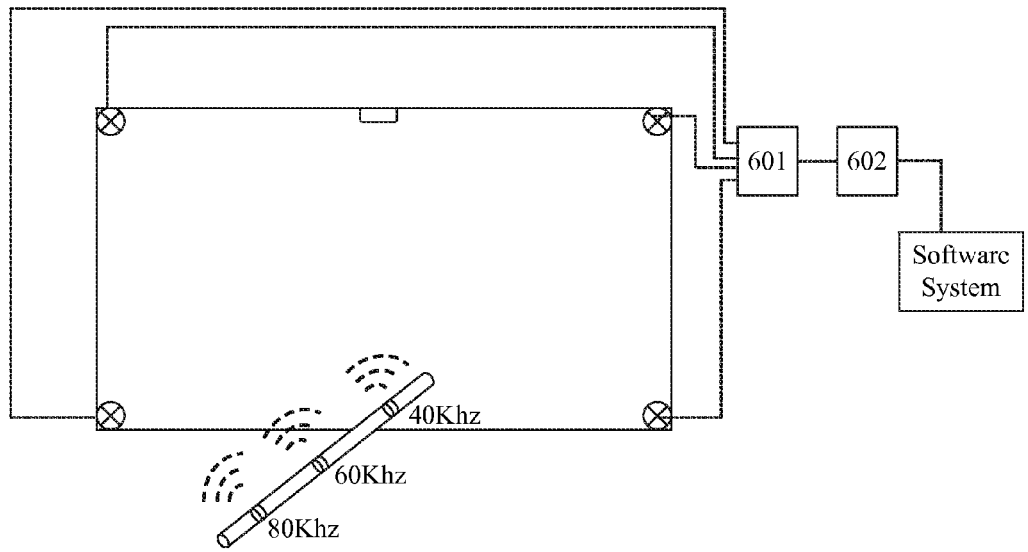
FIG. 6A illustrates a schematic diagram of an exemplary fixed-point tracking using frequency-division multiplexing consistent with the disclosed embodiments.

FIG. 6A illustrates a schematic diagram of an exemplary fixed-point tracking using frequency-division multiplexing consistent with the disclosed embodiments. As shown in FIG. 6A, it is assumed that an object to be tracked is a 3D interactive input device including three nodes. When a 3D interactive operation is performed between the 3D interactive input device and a 3D display device, fixed-point tracking for the 3D interactive input device is performed by the 3D display device.

Frequency-division multiplexing (FDM) is a scheme in which numerous signals are combined for transmission on a single communications line or channel. Each signal is assigned a different frequency within the main channel. The channel is defined by its center frequency, and its bandwidth. Because there are multiple nodes on the 3D interactive input device and each node needs to transmit a corresponding position detection signal (e.g., an ultrasonic wave signal), different frequencies can be used by different nodes, such that the various nodes can be effectively distinguished.

Specifically, a certain interval can be configured between transmission frequencies used by each node. For example, three nodes use transmission frequency 40 Khz, 60 Khz and 80 Khz, respectively.

Receivers (e.g., ultrasonic wave receivers) are configured to receive position detection signals. The receivers are set on at least three nodes of the 3D display device. Also, each receiver needs to cover all frequencies used by the multiple nodes on the 3D interactive input device.

Corresponding to the signal processor shown in FIG. 2A, the structure of the system shown in FIG. 6A may include a frequency identification module 601 and a signal processing module 602.

The frequency identification module 601 is configured to identify and separate the position detection signal received by each receiver, and correlate the position detection signal with each node on the 3D interactive input device.

The signal processing module 602 is configured to convert the position detection signal correlated with each node outputted by the frequency identification module 601 to arrival time (that is, the length of transmission time of the position detection signal), and calculate respectively spatial position coordinates corresponding to each node on the 3D interactive input device to upload the spatial position coordinates to the software system.

Figure 6B:
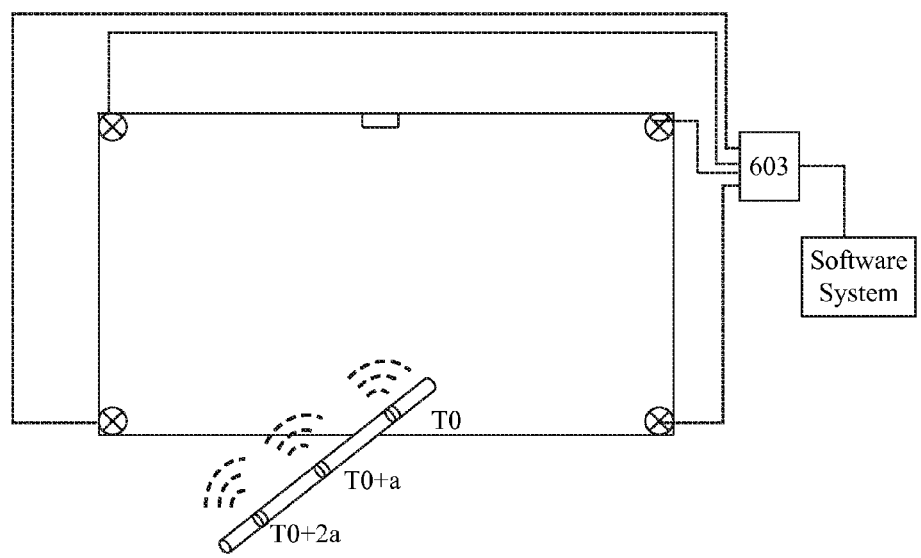
FIG. 6B illustrates a schematic diagram of an exemplary fixed-point tracking using time-division multiplexing consistent with the disclosed embodiments.

FIG. 6B illustrates a schematic diagram of an exemplary fixed-point tracking using time-division multiplexing consistent with the disclosed embodiments. As shown in FIG. 6B, it is assumed that an object to be tracked is a 3D interactive input device including three nodes. When a 3D interactive operation is performed between the 3D interactive input device and a 3D display device, fixed-point tracking for the 3D interactive input device is performed by the 3D display device.

Time-division multiplexing (TDM) is a scheme of putting multiple data streams in a single signal by separating the signal into many segments, each having a very short period of time (i.e., time slot or time interval). A channel is made up of a sequence of time slots. Because there are multiple nodes on the 3D interactive input device and each node needs to transmit the corresponding position detection signal (e.g., an ultrasonic wave signal), different time domain resources (i.e., time interval) can be used among the nodes, such that the various nodes can be effectively distinguished.

Specifically, each node has the same transmission frequency for the position detection signal, and each node transmits the position detection signal using a short time interval (e.g., a millisecond level). The short time interval needs to be greater than the length of time during which waveform of the receiver attenuates and echo ends, such that accuracy of the signal from each node is ensured. That is, when the next node transmits the signal, the utilized channel is not occupied (the signals that occupy the channel may include the position detection signals transmitted by the other nodes, and other interference signals such as echo and noise).

Therefore, each node has an exclusive time slot to ensure that it is not interfered by the signals from other nodes. In general, the short time interval can be set as 3-5 milliseconds. However, the setting of the short time interval is not limited herein. $T_0$ shown in FIG. 6B represents a time point at which the first node transmits the signal, and a represents the short time interval.

Receivers (e.g., ultrasonic wave receivers) are configured to receive the position detection signals. The receivers are configured on at least three nodes of the 3D display device. A signal processor 603 (equivalent to signal processor 3 shown in FIG. 2A) is configured on the 3D display device. The signal processor 603 is configured to monitor a starting time point of the exclusive time slot for each node on the 3D interactive input device, monitor arrival status of the signal transmitted by each node, record arrival time of each node, and calculate respectively spatial position coordinates of each node to upload the spatial position coordinates to the software system.

Figure 6C:
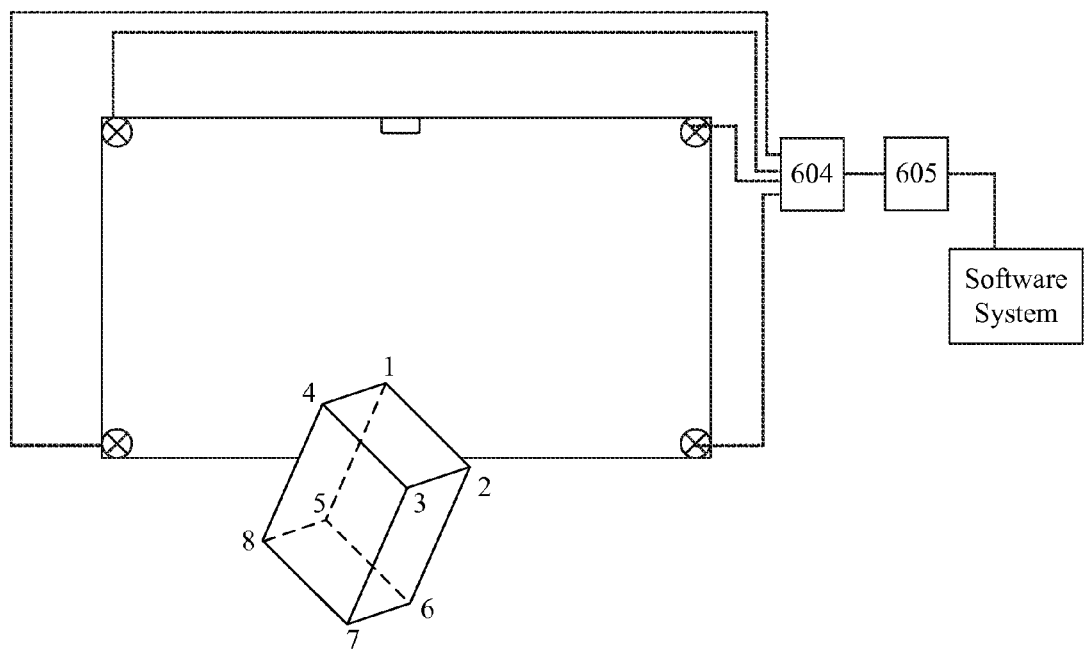
FIG. 6C illustrates a schematic diagram of an exemplary fixed-point tracking using frequency-division multiplexing and time-division multiplexing consistent with the disclosed embodiments.

FIG. 6C illustrates a schematic diagram of an exemplary fixed-point tracking using frequency-division multiplexing and time-division multiplexing consistent with the disclosed embodiments. As shown in FIG. 6C, when the object to be tracked has complex structures and high requirements for the details, it needs to set more nodes. In order to improve detection efficiency and synchronization of a 3D interactive operation, the fixed-point tracking using the frequency-division multiplexing in combination with the time-division multiplexing is utilized.

For the object to be tracked which has eight nodes, the eight nodes can be allocated to multiple frequencies or frequency bands for frequency-division multiplexing. Various nodes having the same frequency or frequency band transmit signals in a short time interval for time-division multiplexing. Therefore, at least the frequency/frequency band or the transmission time point between any two nodes is different, thereby effectively distinguishing and identifying each node. The number of obtained channels using the frequency-division multiplexing in combination with the time-division multiplexing is the product of the number of channels using the frequency-division multiplexing and the number of channels using the time-division multiplexing, greatly increasing the number of channels. This greatly increases response rate and tracking accuracy of the multi-node tracking.

In one embodiment, reducing the number of channels using time-division multiplexing and increasing the number of channels using frequency-division multiplexing may greatly increase the response rate of the multi-node tracking. In addition, increasing the number of channels using time-division multiplexing and reducing the number of channels using frequency-division multiplexing can obviously reduce manufacturing cost of the 3D interactive system.

Specifically, for example, nodes 1-3 are allocated to 40 Khz; nodes 4-6 are allocated to 60 Khz; and nodes 7-8 are allocated to 80 Khz. Nodes 1, 4 and 7 transmit signals at time point $T_0$ ; nodes 2, 5 and 8 transmit signals at time point $T_0+a$; and nodes 3 and 6 transmit signals at time point $T_0+2a$.

Receivers (e.g., ultrasonic wave receivers) are configured to receive the position detection signals. The receivers are configured on at least three nodes of the 3D display device. Also, each receiver needs to cover all frequency bands used by the multiple nodes on the 3D interactive input device.

Corresponding to the signal processor 3 shown in FIG. 2A, the system structure shown in FIG. 6C may include a frequency identification module 604 and a signal processing module 605.

The frequency identification module 604 is configured to identify and separate the position detection signal received by each receiver, and correlate the position detection signal with each node on the 3D interactive input device.

The signal processing module 605 is configured to monitor a starting time point of the exclusive time slot for each node on the 3D interactive input device, monitor arrival status of the signal transmitted by each node, and record arrival time of each node. The signal processing module 605 is also configured to convert the position detection signal outputted by the frequency identification module 604 to the arrival time (that is, the length of transmission time of the position detection signal). At last, based on the arrival time, the signal processing module 605 calculates respectively spatial position coordinates corresponding to each node on the 3D interactive input device to upload the spatial position coordinates to the software system.

It should be noted that, in order to implement the channel division operation as shown in FIGS. 6A to 6C, the corresponding function modules may be provided in the structure of the 3D interactive system 10 shown in FIG. 1.

The processing device 300 may further include a pre-correlation setting unit 300F and a signal frequency identification unit 300G. The pre-correlation setting unit 300F is configured to, under a condition that every signal transmission device transmits a position detection signal using a different channel resource, configure a pre-correlation between every signal transmission device and the corresponding channel resource. The signal frequency identification unit 300G is configured to perform a frequency identification and separation operation for the position detection signal received by each signal receiving device, such that the signal transmission device corresponding to the received position detection signal and the corresponding ending time point can be determined.

Through performing appropriate correlation configuration and frequency identification for the channel resource utilized by the position detection signal, the position detection signal which uses a different channel resource can be effectively distinguished and monitored, facilitating the fixed-point tracking for multiple nodes.

The processing device 300 may further include a time slot determination unit 300H and a signal monitoring unit 300I. The time slot determination unit 300H is configured to, under a condition that every signal transmission device transmits the position detection signal using a different time domain channel resource, determine corresponding time slot based on the time domain channel resource utilized by each signal transmission device. The signal monitoring unit 300I is configured to, in each time slot, monitor arrival status of the position detection signal transmitted by the corresponding signal transmission device, such that the corresponding ending time point can be determined.

Through reasonably allocating the time domain channel resource utilized by the position detection signal and monitoring the corresponding time slot, the position detection signal which uses a different time domain channel resource can be effectively distinguished and monitored, facilitating the fixed-point tracking for multiple nodes.

When frequency-division multiplexing in combination with time-division multiplexing is used, the position detection signal can be detected in frequency domain and time domain at the same time through the pre-correlation setting unit 300F, the signal frequency identification unit 300G, the time slot determination unit 300H and the signal monitoring unit 300I. Therefore, tracking and monitoring multiple fixed-points can be implemented.

Figure 7:
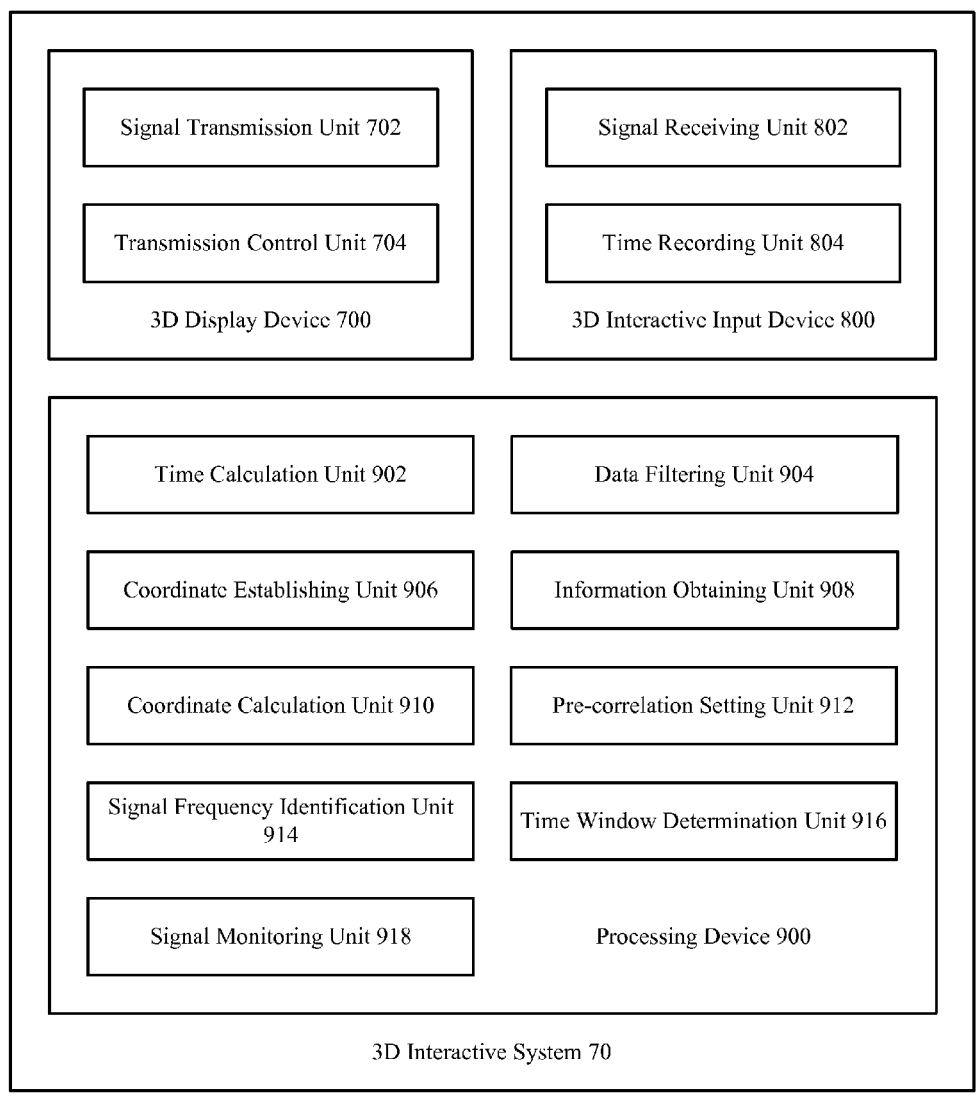
FIG. 7 illustrates a block diagram of another exemplary 3D interactive system consistent with the disclosed embodiments.

For the system architecture of "static transmitting and dynamic receiving", FIG. 7 illustrates a block diagram of another exemplary 3D interactive system 70 consistent with the disclosed embodiments. As shown in FIG. 7, the 3D interactive system 70 may be configured to perform a 3D interactive operating process between a 3D interactive input device 800 and a 3D display device 700.

The 3D display device 700 may include a signal transmission unit 702 and a transmission control unit 704. The signal transmission unit 702 includes signal transmission devices. The signal transmission devices are configured respectively on at least three second nodes on the 3D display device 700 (any three second nodes are non-collinear but coplanar). The transmission control unit 704 is configured to control every signal transmission device to transmit a position detection signal using the corresponding channel resource according to a received start command. The channel resources include different frequency sub-bands corresponding to the signals for a frequency-division transmission technique (that is, each frequency sub-band is used to carry a separate signal for a frequency-division transmission technique), different time slots corresponding to the signals for a time-division transmission technique, and independent time slots of the frequency sub-bands corresponding to the signals for a combined frequency-division and time-division transmission technique.

The 3D interactive input device 800 may include a signal receiving unit 802 and a time recording unit 804. The signal receiving unit 802 includes signal receiving devices configured respectively on multiple first nodes of the 3D interactive input device 800. The time recording unit 804 is configured to record a starting time point at which the 3D display device 700 receives the start command, and a corresponding ending time point at which every signal receiving device receives the position detection signal from every signal transmission device.

The 3D interactive system 70 may also include a processing device 900. The processing device 900 is configured to determine 3D spatial position coordinates of each first node relative to a specific surface based on the starting time point, the ending time point and the 3D spatial position coordinates of each second node relative to the specific surface on the 3D display device 700, and rebuild 3D contour of the 3D interactive input device based on the 3D spatial position coordinates of the at least two first nodes relative to the specific surface, such that gestures of the 3D interactive input device can be determined and the 3D interactive operating process can be realized.

The signal transmission devices can be configured on the 3D display device 700 and the signal receiving devices can be configured on the 3D interactive input device 800, such that a system architecture of "static transmitting and dynamic receiving" is used.

Through utilizing different channel resources among various signal transmission devices, the source of the position detection signal received by every signal receiving device can be recognized accurately, thereby avoiding confusion between the channel resources caused by the increasing of the number of the first nodes and helping to improve the success rate and accuracy of multi-point position tracking.

After 3D spatial position coordinates of every first node are obtained, through extending lines (i.e., straight lines or lines with other preset shapes) between multiple first nodes (for example, operations between any two adjacent first nodes, or operations based on a pre-correlation between every first nodes), the 3D contour of the 3D interactive input device 800 can be obtained. At the same time, because the 3D spatial position coordinates of the first nodes are defined based on the specific surface of the 3D display device 700, the 3D contour of the 3D interactive input device 800 is allowed to correlate with the 3D display device 700, such that gesture information of the 3D interactive input device 800 relative to the specific surface (that is, the 3D display device 700 or 3D display contents of the 3D display device 700) can be determined, further the 3D interactive operation between the 3D interactive input device 800 and the 3D display contents of the 3D display device 700 can be realized more elaborately to improve user experience.

The signal transmission unit 702 may further include a start signal transmission end configured on the 3D display device 700. The signal receiving unit 802 further includes a start signal receiving end configured on the 3D interactive input device 800. The time recording unit 804 is configured to, when the start signal receiving end receives the start signal sent by the start signal transmission end, confirm that the start command is received and record the corresponding starting time point.

Transmission of the start signal allows all signal receiving devices to start counting time at the same time, realizing synchronization among all the signal receiving devices. Further, based on length of time for every signal receiving device receiving the position detection signal, every distance between every signal transmission device and every signal receiving device (that is, between the first node and the second node) can be calculated, thereby realizing accurate position tracking for every first node.

Transmission speed of the start signal is faster than the transmission speed of the position detection signal, such that detection of transmission time of the position detection signal is not affected by the transmission of the start signal, ensuring accurate position tracking for every first node. In order to meet the above speed relationship, the position detection signal may be an ultrasonic wave signal and the start signal may be an infrared signal, an electrical signal or a radio signal.

Of course, through obtaining the transmission speed of the start signal in advance, even though the transmission speed of the start signal is relatively slow, the accurate position tracking for every first node can still be realized by compensating the transmission time of the position detection signal during the calculation process.

Figure 8:
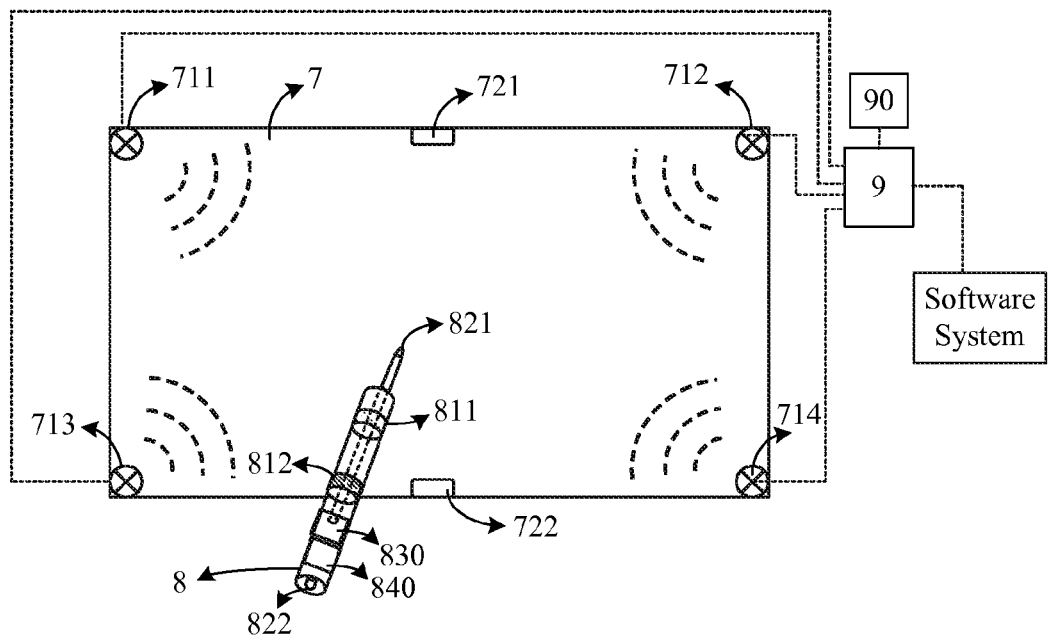
FIG. 8 illustrates a schematic diagram of an exemplary 3D interactive system shown in FIG. 7 consistent with the disclosed embodiments.

FIG. 8 illustrates a schematic diagram of an exemplary 3D interactive system shown in FIG. 7 consistent with the disclosed embodiments. As shown in FIG. 8, a 3D display device includes a display surface 7, a signal processor 9 and a software system. The 3D interactive operation is realized by using the 3D display device and a 3D interactive operation rod 8 (the 3D interactive operation rod is taken as an example here).

A transmission system is configured on the display surface 7, and a receiving system is configured on the 3D interactive operation rod 8. The software system of the 3D display device forms a processing system. The detailed description for each system is described as follows.

The transmission system includes ultrasonic transmitters 711, 712, 713 and 714, infrared (IR) transmitters 721 and 722, a control module 9 and a communication module 90.

The ultrasonic transmitters 711, 712, 713 and 714 are configured on four different nodes (the four nodes are non-collinear) of the display surface 7 and transmit ultrasonic wave signals, respectively. Of course, when the shape is more complicated or the requirement for the precision is higher, more nodes (e.g., 3 or more) can be selected to configure more ultrasonic transmitters (not show in FIG. 8). The number of the nodes and the number of the ultrasonic transmitters are not limited herein.

The IR transmitters 721 and 722 can be configured at any position of the display surface 7, such that the transmission of the infrared ray can be easily implemented. On one hand, the IR transmitters can be configured at any position of the display surface (the positions of the IR transmitters 721 and 722 shown in FIG. 8 are examples only); on the other hand, the number of the IR transmitters can be at least one. Synchronization for receiving the ultrasonic wave signals can be realized through the infrared transmission. Therefore, the installation position and the number of the IR transmitters are not limited herein.

The control module 9 is configured to control signal transmission of the ultrasonic transmitters 711, 712, 713 and 714 and the IR transmitters 721 and 722. The communication module 90 is configured to communicate with the 3D interactive operation rod 8.

The receiving system includes ultrasonic receivers 811 and 812, infrared (IR) receivers 821 and 822, a signal processing module 830 and a communication module 840.

The ultrasonic receivers 811 and 812 are configured on the 3D interactive operation rod 8. The number of the ultrasonic receivers can be determined based on the shape and structure of the 3D interactive operation rod and precision requirements. The number of the ultrasonic receivers is not limited herein.

The IR receivers 821 and 822 are configured on the 3D interactive operation rod 8. The IR receivers 821 and 822 are configured to receive the infrared ray transmitted by the IR transmitters 271 and 722. The communication module 840 is configured to communicate with the 3D display device.

Referring to the 3D interactive system 70 shown in FIG. 7, the processing device 900 may be configured in the 3D display device 700, or in the 3D interactive input device 800. The processing device 900 may also be configured outside the 3D display device 700 and the 3D interactive input device 800. Therefore, for the processing system shown in FIG. 8, there exist several implementing modes.

In a first mode, the processing device 900 shown in FIG. 7 may be configured in the 3D interactive input device 800. That is, the processing system shown in FIG. 8 can be constituted by the signal processing module 830 in the 3D interactive operation rod 8.

Specifically, the signal processing module 830 records the time point at which each ultrasonic receiver (corresponding to every node on the 3D interactive input device 800) receives the ultrasonic wave signal, calculates transmission time of the ultrasonic wave signal transmitted by every ultrasonic transmitter and converts the transmission time to the distance between every ultrasonic receiver and every ultrasonic transmitter on the display surface 7.

Based on the distance between every ultrasonic transmitter and every ultrasonic receiver, the signal processing module 830 calculates the spatial position coordinates of each node on the 3D interactive operation rod 8. Further, the signal processing module 830 can integrate the spatial position coordinates of each node into a coordinate system of the display screen of the 3D display device, such that the 3D spatial position coordinates of the 3D interactive operation rod 8 can be obtained. Or, the signal processing module 830 sends the spatial position coordinates of each node to the software system through the communication module 840, and the software system integrates the spatial position coordinates of each node into the coordinate system of the display screen of the 3D display device.

In a second mode, the processing device 900 shown in FIG. 7 may be configured in the 3D display device 700. That is, the processing system shown in FIG. 8 can be constituted by the control module 9 in the 3D display device.

Specifically, the signal processing module 830 records the time point at which each ultrasonic receiver (corresponding to every node on the 3D interactive input device 800) receives the ultrasonic wave signal and sends the time point to the control module 9 through the interaction between the communication module 840 and the communication module 90.

The control module 9 calculates the spatial position coordinates of each node on the 3D interactive operation rod 8. Further, the control module 9 can integrate the spatial position coordinates of each node into the coordinate system of the display screen of the 3D display device, such that the 3D spatial position coordinates of the 3D interactive operation rod 8 can be obtained. Or, the signal processing module 830 sends the spatial position coordinates of each node to the software system, and the software system integrates the spatial position coordinates of each node into the coordinate system of the display screen of the 3D display device.

In a third mode, the processing device 900 shown in FIG. 7 may be configured outside the 3D display device 700 and the 3D interactive input device 800. That is, the processing system shown in FIG. 8 is constituted by an independent processing device (not shown).

Specifically, the signal processing module 830 records the time point at which each ultrasonic receiver (corresponding to every node on the 3D interactive input device 800) receives the ultrasonic wave signal, and sends the time point to the processing device through the communication module 840.

The processing device calculates the spatial position coordinates of each node on the 3D interactive operation rod 8. Further, the processing device can integrate the spatial position coordinates of each node into the coordinate system of the display screen of the 3D display device, such that the 3D spatial position coordinates of the 3D interactive operation rod 8 can be obtained. Or, the processing device sends the spatial position coordinates of each node to the software system, and the software system integrates the spatial position coordinates of each node into the coordinate system of the display screen of the 3D display device.

Similarly to the embodiment shown in FIG. 1, the 3D interactive system 70 show in FIG. 7 may include a 3D display device 700, a 3D interactive input device 800, and a processing device 900.

The processing device 900 may include a time calculation unit 902 and a data filtering unit 904. The time calculation unit 902 is configured to, based on the starting time point, the ending time point of each signal receiving device corresponding to any signal transmission device, calculate respectively signal transmission time values corresponding to every signal receiving device and any signal transmission device. The data filtering unit 904 is configured to, when the number of valid signal transmission time values is greater than 3, if the transmission distance corresponding to the smallest valid signal transmission time value is less than or equal to a preset multipath threshold distance of the 3D display device, filter out the smallest valid signal transmission time value.

The signal transmission time (value) refers to the length of time between the time of the signal transmission device transmitting the position detection signal and the time of the signal receiving device receiving the position detection signal. When the distance between the signal transmission device and the signal receiving device is too small (that is, the distance is less than or equal to the preset multipath threshold distance), the position detection signal may be transmitted through the solid structure of the 3D display device. For example, when the position detection signal is an ultrasonic wave signal, because the transmission speed of the ultrasonic wave in the solid material is faster than the transmission speed of the ultrasonic wave in air, the position detection signal transmitted along the solid material arrives at the signal receiving device in advance, thus the transmission time of the corresponding signal is shortened.

Through detecting the valid signal transmission time corresponding to every signal receiving device and filtering the valid signal transmission time (transmission distance is less than or equal to the preset multipath threshold distance), the error or deviation caused by multipath effect can be effectively avoided.

Because the area of the display screen of the 3D display device 700 is limited, and the transmission speed of the position detection signal is constant, the signal transmission time corresponding to the signal receiving device is within a certain fixed preset range. Therefore, the signal transmission time value within the preset range is valid signal transmission time; otherwise, the signal transmission time is invalid. Through judging whether the signal transmission time value is valid, the signal transmission time is initially filtered, thereby improving accuracy for detecting the 3D spatial position coordinates of the 3D interactive input device 800.

At the same time, because generation of multipath effect is related to the shape and material of the 3D interactive input device and position selection of the second node, measurement needs to be performed in advance based on the specific situation of the 3D interactive input device to obtain the corresponding preset multipath threshold distance.

The data filtering unit 904 may be also configured to, if transmission distance corresponding to the smallest valid signal transmission time value is greater than the preset multipath threshold distance, filter out the largest valid signal transmission time value.

Through filtering out the largest valid signal transmission time value, when the distance is too long, the inaccurate data reading caused by too weak position detection signal is avoided.

Similarly to the embodiment shown in FIG. 1, the spatial position coordinates of each node can be calculated. Then, based on the spatial position coordinates of all the nodes, the 3D spatial position coordinates of the 3D interactive input device relative to the 3D display device are calculated.

Also, the spatial position coordinates of the single-node can be obtained by using the process shown in FIG. 3.

Optionally, the processing device 900 may further include a coordinate establishing unit 906, an information obtaining unit 908, and a coordinate calculation unit 910. The coordinate establishing unit 906 may be configured to establish a 3D spatial coordinate system based on a specific surface. The information obtaining unit 908 may be configured to obtain coordinates of each second node relative to the 3D spatial coordinate system.

The coordinate calculation unit 910 may be configured to establish an equation of each second node relative to any first node by:

$$(x_n-x)^2+(y_n-y)^2+(z_n-z)^2=[(T_n-T_0)\cdot v]^2$$

wherein $(x_n, y_n, z_n)$ is coordinates of the nth second node relative to the 3D spatial coordinate system; $(x, y, z)$ represents to-be-solved parameters of the coordinates of any first node relative to the 3D spatial coordinate system; $T_n$ represents an ending time point between the nth second node and any first node; $T_0$ represents a starting time point; and v is transmission speed of the position detection signal.

The coordinate calculation unit 910 may also be configured to, based on all the established equations, calculate coordinates of any first node relative to the 3D spatial coordinate system as 3D spatial position coordinates of any first node relative to the specific surface.

Optionally, the coordinate establishing unit 906 may be configured to, when the specific surface is a rectangular display surface of the 3D display device, configure the origin of the 3D spatial coordinate system at the diagonal intersection of the rectangular display surface, configure the first axis along the first side of the rectangular display surface, configure the second axis along the second side of the rectangular display surface and configure the third axis perpendicular to the rectangular display surface; wherein the first side is perpendicular to the second side, the second node is configured at the rectangular display surface, each second node has at least one symmetrical second node, and the symmetrical axis is at least one axis of the 3D spatial coordinate system.

Through appropriately setting for the 3D spatial coordinate system and the second nodes (that is, a symmetrical relationship among the second nodes), when the corresponding formula is established, the amount of calculation can be effectively reduced, thereby reducing processing demands for the corresponding hardware devices. Real-time capability of the data calculation is enhanced and the occurrence of delay during the 3D interactive operating process is reduced.

In addition, for multiple nodes fixed-point tracking at the same time, in order to solve the channel occupancy problem, frequency-division multiplexing and/or time frequency-division multiplexing can also be used.

In combination with FIGS. 9A, 9B and 9C, 3 specific implementing modes for solving the channel occupancy problem are described as follows.

Figure 9A:
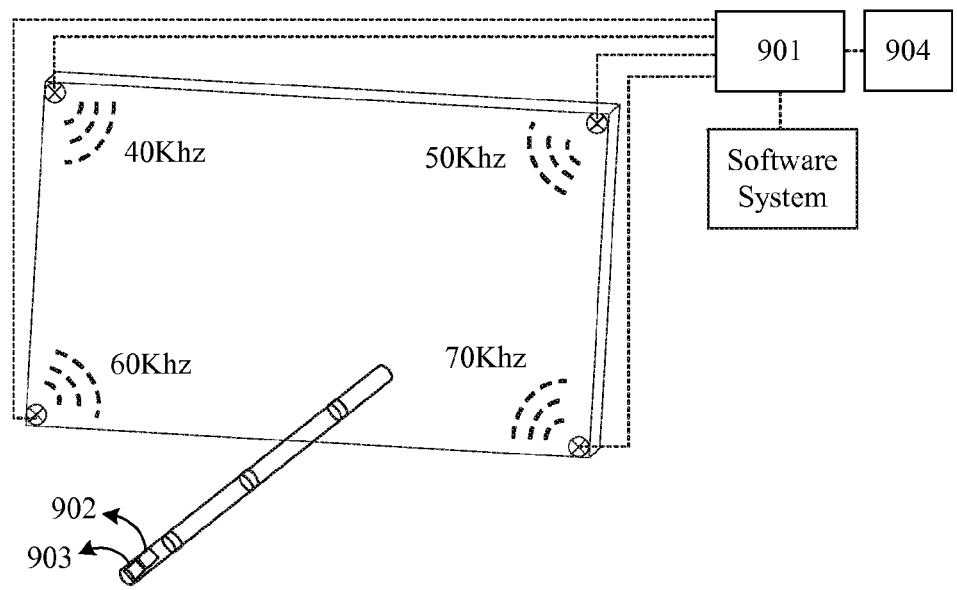
FIG. 9A illustrates a schematic diagram of another exemplary fixed-point tracking using frequency-division multiplexing consistent with the disclosed embodiments.

FIG. 9A illustrates a schematic diagram of another exemplary fixed-point tracking using frequency-division multiplexing consistent with the disclosed embodiments. As shown in FIG. 9A, it is assumed that an object to be tracked is a 3D interactive input device including the n number of nodes. When a 3D interactive operation is performed between the 3D interactive input device and the 3D display device, fixed-point tracking for the 3D interactive input device is performed by the 3D display device.

At least three nodes (four nodes shown in FIG. 9A) exist on the 3D display device and each node needs to transmit a corresponding position detection signal (e.g., an ultrasonic wave signal). Therefore, different frequencies can be used by different nodes, such that the various nodes can be effectively distinguished.

Specifically, a certain interval can be configured between transmission frequencies used by each node. For example, four nodes use transmission frequency 40 Khz, 50 Khz, 60 Khz and 70 Khz, respectively.

Receivers (e.g., ultrasonic wave receivers) are configured to receive the position detection signals. The receivers are configured on all nodes of the 3D interactive input device. Also, each receiver needs to cover all frequency bands used by the multiple nodes on the 3D display device.

Specifically, the control module 901 on the 3D display device controls each node to transmit the position detection signal. That is, the control module 901 provides a timing sequence of signal transmission between the nodes. The signal processor 902 on the 3D interactive input device 8 is configured to identify and separate the position detection signal, and calculate the spatial position coordinates corresponding to each node. The communication module 903 on the 3D interactive input device 8 is configured to send the spatial position coordinates corresponding to each node to the communication module 904 on the 3D display device. The control module 901 is also configured to obtain the spatial position coordinates received by the communication module 904 and upload the spatial position coordinates to the software system.

Figure 9B:
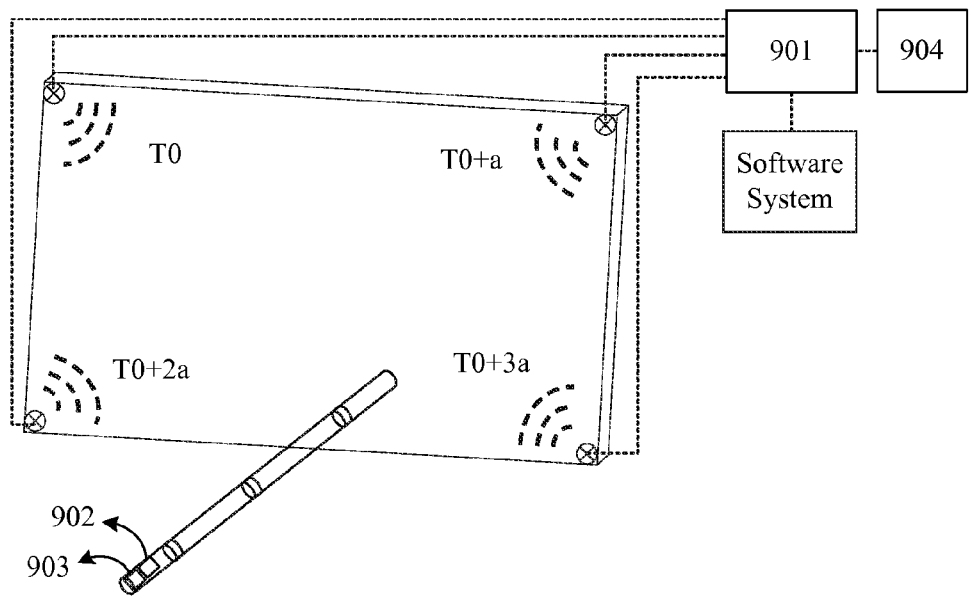
FIG. 9B illustrates a schematic diagram of another exemplary fixed-point tracking using time-division multiplexing consistent with the disclosed embodiments.

FIG. 9B illustrates a schematic diagram of another exemplary fixed-point tracking using time-division multiplexing consistent with the disclosed embodiments. As shown in FIG. 9B, it is assumed that an object to be tracked is the 3D interactive input device including the n number of nodes. When a 3D interactive operation is performed between the 3D interactive input device and the 3D display device, fixed-point tracking for the 3D interactive input device is performed by the 3D display device.

At least three nodes (four nodes shown in FIG. 9B) exist on the 3D display device and each node needs to transmit the corresponding position detection signal (e.g., an ultrasonic wave signal). Therefore, different time domain resources can be used by different nodes, such that the various nodes can be effectively distinguished.

Specifically, each node has the same transmission frequency for the position detection signal, and each node transmits the position detection signal using a short time interval (e.g., a millisecond level). The short time interval needs to be greater than the length of time during which waveform of the receiver attenuates and echo ends, such that accuracy of the signal from each node is ensured. That is, when the next node transmits the signal, the channel utilized is not occupied (the signals that occupy the channel may include the position detection signals transmitted by the other nodes, and other interference signals such as echo and noise).

Therefore, each node has an exclusive time slot to ensure that the signal transmitted by this node is not interfered by the signals from other nodes. In general, the short time interval can be configured as 3-5 milliseconds. However, the setting of the short time interval is not limited herein. $T_0$ shown in FIG. 9B is a time point at which the first node transmits the signal, and a represents the short time interval.

Receivers (e.g., ultrasonic wave receivers) are configured to receive the position detection signal. The receivers are configured on all nodes of the 3D interactive input device.

Specifically, the control module 901 on the 3D display device controls each node to transmit the position detection signal. That is, the control module 901 is responsible for a timing sequence of signal transmission between the nodes. The signal processor 902 on the 3D interactive input device 8 is configured to monitor a starting time point of the exclusive time slot for each node on the 3D interactive input device, monitor arrival status of the signal transmitted by each node, and record arrival time of each node, such that the spatial position coordinates of each node can be calculated. The communication module 903 on the 3D interactive input device 8 is configured to send the spatial position coordinates corresponding to each node to the communication module 904 on the 3D display device. The control module 901 is also configured to obtain the spatial position coordinates received by the communication module 904 and upload the spatial position coordinates to the software system.

Figure 9C:
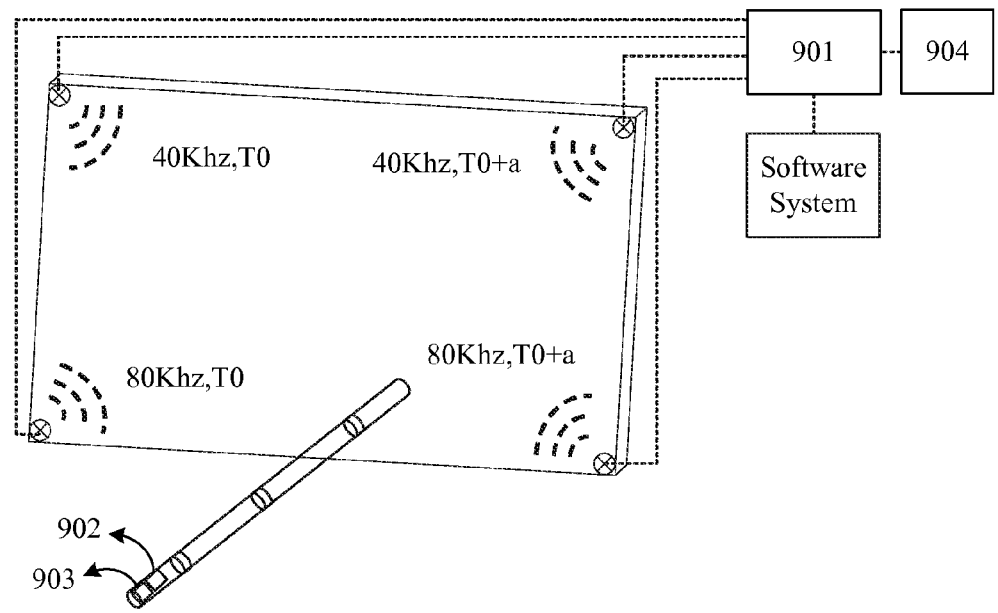
FIG. 9C illustrates a schematic diagram of another exemplary fixed-point tracking using frequency-division multiplexing and time-division multiplexing consistent with the disclosed embodiments.

FIG. 9C illustrates a schematic diagram of another exemplary fixed-point tracking using frequency-division multiplexing and time-division multiplexing consistent with the disclosed embodiments.

As shown in FIG. 9C, when the display surface 7 has four nodes, the four nodes can be allocated to multiple frequencies or frequency bands (that is, frequency-division multiplexing). Various nodes having the same frequency or the same frequency band transmit signals in a short time interval manner (that is, time-division multiplexing). Therefore, at least frequency/frequency band or transmission time point between any two nodes is different, thereby effectively distinguishing and identifying each node.

Specifically, for example, node 1 in the top-left corner and node 2 in the top-right corner are allocated to 40 Khz; and node 3 in the bottom-left corner and node 4 in the bottom-right corner are allocated to 80 Khz. Nodes 1 and 3 transmit signals at time point $T_0$; nodes 2 and 4 transmit signals at time point $T_0+a$.

Receivers (e.g., ultrasonic wave receivers) are configured to receive the position detection signal. The receivers are configured on all nodes of the 3D display device.

Specifically, the control module 901 on the 3D display device controls each node to transmit the position detection signal. That is, the control module 901 provides a timing sequence of signal transmission between the nodes.

The signal processor 902 on the 3D interactive input device 8 is configured to monitor a starting time point of the exclusive time slot for each node on the 3D interactive input device, monitor arrival status of the signal transmitted by each node, and record arrival time of each node. The signal processor 902 is also configured to convert the position detection signal outputted by the frequency identification module 601 to the arrival time (that is, the length of transmission time of the position detection signal). At last, based on the arrival time, the spatial position coordinates of each node on the 3D interactive input device are calculated.

The communication module 903 on the 3D interactive input device 8 is configured to send the spatial position coordinates corresponding to each node to the communication module 904 on the 3D display device. The control module 901 is also configured to obtain the spatial position coordinates received by the communication module 904 and upload the spatial position coordinates to the software system.

It should be noted that, in order to implement the channel division operation as shown in FIGS. 9A to 9C, the corresponding function modules may be provided in the structure of the 3D interactive system 70 shown in FIG. 7.

Optionally, the processing device 900 may further include a pre-correlation setting unit 912 and a signal frequency identification unit 914. The pre-correlation setting unit 912 is configured to, under a condition that every signal transmission device transmits the position detection signal using a different channel resource, configure a pre-correlation between every signal transmission device and the corresponding channel resource. The signal frequency identification unit 914 is configured to perform a frequency identification and separation operation for the position detection signal received by every signal receiving device, such that the signal transmission device corresponding to the received position detection signal and the corresponding ending time point can be determined.

Through appropriate correlation setting and frequency identification processing for the frequency sub-band utilized by the position detection signal, the position detection signal which uses a different frequency sub-band can be effectively distinguished and monitored, facilitating the fixed-point tracking for multiple nodes.

Optionally, the processing device 900 further includes a time slot determination unit 916 and a signal monitoring unit 918. The time slot determination unit 916 is configured to, under a condition that every signal transmission device transmits the position detection signal using a different time domain channel resource, determine the corresponding time slot based on the time domain channel resource utilized by each signal transmission device. The signal monitoring unit 918 is configured to, in each time slot, monitor arrival status of the position detection signal transmitted by the corresponding signal transmission device, such that the corresponding ending time point can be determined.

Through reasonably allocating the time domain channel resource utilized by the position detection signal and monitoring the corresponding time slot, the position detection signal which uses a different time domain channel resource can be effectively distinguished and monitored, facilitating the fixed-point tracking for multiple nodes.

When frequency-division multiplexing and time-division multiplexing is used, the position detection signal can be detected in frequency domain and time domain at the same time through the pre-correlation setting unit 912, the signal frequency identification unit 914, the time slot determination unit 916 and the signal monitoring unit 918. Therefore, multiple fixed-points tracking and monitoring processing can be implemented.

The 3D interactive methods and systems are provided in this disclosure. When fixed-point tracking for multiple nodes is performed, the channel occupancy problem can be effectively resolved, thereby avoiding confusion of signal transmission caused by multiple nodes.

Further, although the methods and systems are disclosed for illustrative purposes, similar concept and approach can be applied to other wearable systems. Other applications, advantages, alternations, modifications, or equivalents to the disclosed embodiments are obvious to those skilled in the art.

What is claimed is:

1. A three-dimensional (3D) interactive method between a 3D interactive input device including multiple first nodes and a 3D display device including at least three second nodes, comprising:
    receiving a start command from a user;
    based on the received start command, controlling multiple signal transmission devices to transmit position detection signals using different channel resources;
    based on a starting time point of the received start command, ending time points at which signal receiving devices receive position detection signals from the signal transmission devices, and 3D spatial position coordinates of the second nodes relative to a specific surface of the 3D display device, determining 3D spatial position coordinates of the first nodes relative to the specific surface; and
    based on the 3D spatial position coordinates of at least two first nodes relative to the specific surface, rebuilding 3D contour of the 3D interactive input device to determine gestures of the 3D interactive input device
    wherein the determining the 3D spatial position coordinates of the first nodes relative to the specific surface includes: establishing a 3D spatial coordinate system based on the specific surface;
    obtaining coordinates of the second nodes relative to the 3D spatial coordinate system
    establishing equations of the second nodes relative to any first node by:

$$(x_n-x)^2+(y_n-y)^2+(z_n-z)^2=[(T_n-T_o)^*v]^2$$

wherein $(x_n, y_n, z_n)$ is coordinates of the nth second node relative to the 3D spatial coordinate system; (x, y, z) represents to-be-solved parameters of the coordinates of a first node relative to the 3D spatial coordinate system; $T_n$, $T_o$ represents a starting time point; and v is transmission speed of the position detection signal; and
    based on all the established equations, calculating coordinates of the first nodes relative to the 3D spatial coordinate system as 3D spatial position coordinates of the first nodes relative to the specific surface.

2. The 3D interactive method according to claim 1, wherein:
    any three second nodes among the at least three second nodes are non-collinear but coplanar;
    when the signal transmission devices are configured on the first nodes, the corresponding signal receiving devices are configured on the second nodes; and
    when the signal receiving devices are configured on the first nodes, the signal transmission devices are configured on the second nodes.

3. The 3D interactive method according to claim 1, further including:
    based on the starting time point and the ending time points of the signal receiving devices corresponding to any signal transmission device, calculating respectively signal transmission time values corresponding to the signal receiving devices and any signal transmission device; and
    when a total number of valid signal transmission time values is greater than 3 and a transmission distance corresponding to the smallest valid signal transmission time value is less than or equal to a preset multipath threshold distance, filtering out the smallest valid signal transmission time value.

4. The 3D interactive method according to claim 3, further including:
    when the transmission distance corresponding to the smallest valid signal transmission time value is greater than the preset multipath threshold distance, filtering out the largest valid signal transmission time value.

5. The 3D interactive method according to claim 1, when the specific surface is a rectangular display surface of the 3D display device, further including:
configuring the origin of the 3D spatial coordinate system at a diagonal intersection of the rectangular display surface;
configuring a first axis along a first side of the rectangular display surface;
configuring a second axis along a second side of the rectangular display surface; and
configuring a third axis perpendicular to a third side of the rectangular display surface, wherein the first side is perpendicular to the second side; the second nodes are configured at the rectangular display surface; each of the second nodes has at least one symmetrical second node; and a symmetrical axis is at least one axis of the 3D spatial coordinate system.

6. The 3D interactive method according to claim 1, when the signal transmission devices transmit the position detection signals using different time domain channel resources, further including:
configuring pre-correlations between the signal transmission devices and corresponding channel resources of the signal transmission devices; and
identifying and separating the position detection signals received by the signal receiving devices to determine the signal transmission devices and the ending time points corresponding to the received position detection signals.

7. The 3D interactive method according to claim 1, when the signal transmission devices transmit a position detection signals using different frequency domain channel resources, further including:
based on the time domain resources utilized by the signal transmission devices, determining corresponding time slots; and
monitoring arrival status of the position detection signals transmitted by the corresponding signal transmission devices in the time slots, such that the corresponding ending time points are determined.

8. A three-dimensional (3D) interactive system between a 3D interactive input device and a 3D display device, comprising;
a signal transmission unit including multiple signal transmission devices, wherein the signal transmission devices are configured respectively on one of multiple first nodes of the 3D interactive input device and at least three second nodes of the 3D display device, and any three second nodes among the at least three second nodes are non-collinear but coplanar;
a transmission control unit configured to control signal transmission devices to transmit position detection signals using different channel resources based on a received start command;
a signal receiving unit including multiple signal receiving devices, wherein;
when the signal transmission devices are configured on the first nodes, the signal receiving devices are configured on the second nodes; and
when the signal transmission devices are configured on the second nodes, the signal receiving devices are configured on the first nodes;
a time recording unit configured to record a starting time point of the received start command, and corresponding ending time points at which the signal receiving devices receive the position detection signals from the signal transmission devices; and a processing device configured to determine 3D spatial position coordinates of the first nodes relative to a specific surface based on the starting time point, the ending time points and 3D spatial position coordinates of the second nodes relative to the specific surface on the 3D display device, and rebuild 3D contour of the 3D interactive input device based on the 3D spatial position coordinates of at least two first nodes relative to the specific surface, such that gestures of the 3D interactive input device are determined and a 3D interactive process is implemented
wherein the processing device further includes:
a coordinate establishing unit configured to establish a 3D spatial coordinate system based on the specific surface;
an information obtaining unit configured to obtain coordinates of the second nodes relative to the 3D spatial coordinate system; and
a coordinate calculation unit configured to:
establish equations of the second nodes relative to any first node by:

$$(x_n-x)^2+(y_n-y)^2+(z_n-z)^2=[(T_n-T_o)^*v]^2$$

wherein $(x_n, y_n, z_n)$ is coordinates of the nth second node relative to the 3D spatial coordinate system; (x, y, z) represents to-be-solved parameters of the coordinates of a first node relative to the 3D spatial coordinates system; $T_n$ represents an ending time point between the nth second node and the first node; $T_o$ represents a starting time point; and v is transmission speed of the position detection signal; and
based on all the established equations, calculate coordinates of the first nodes relative to the 3D spatial coordinate system as the 3D spatial position coordinates of the first nodes relative to the specific surface.

9. The 3D interactive system according to claim 8, wherein the processing device is configured at one of the following positions:
inside the 3D display device;
inside the 3D interactive input device; and
outside the 3D display device and the 3D interactive input device.

10. The 3D interactive system according to claim 9, wherein the processing device further includes:
a pre-correlation setting unit configured to, under a condition that the signal transmission devices transmit the position detection signals using different frequency domain channel resources, configure pre-correlations between the signal transmission devices and the corresponding channel resources; and
a signal frequency identification unit configured to perform frequency identification and separation for the position detection signals received by the signal receiving devices, such that the signal transmission devices corresponding to the received position detection signals and the corresponding ending time points are determined.

11. The 3D interactive system according to claim 9, wherein the processing device further includes:
a window time determination unit configured to, under a condition that the signal transmission devices transmit the position detection signals using different time domain channel resources, determine the corresponding window times based on the time domain channel resources utilized by the signal transmission devices; and
a signal monitoring unit configured to, in the window times, monitor arrival status of the position detection signals transmitted by the corresponding signal transmission devices, such that the corresponding ending time points are determined.

12. The 3D interactive system according to claim 8, wherein the processing device further includes:
- a time calculation unit configured to, based on the starting time point, the ending time points of the signal receiving devices corresponding to any signal transmission device, calculate respectively signal transmission time values corresponding to the signal receiving devices and any signal transmission device; and
- a data filtering unit configured to, when a total number of valid signal transmission time values is greater than 3 and a transmission distance corresponding to the smallest valid signal transmission time value is less than or equal to a preset multipath threshold distance of the 3D display device, filter out the smallest valid signal transmission time value.

13. The 3D interactive system according to claim 12, wherein the data filtering unit is further configured to:
- when the transmission distance corresponding to the smallest valid signal transmission time value is greater than the preset multipath threshold distance, filter out the largest valid signal transmission time value.

14. The 3D interactive system according to claim 8, wherein the coordinate establishing unit is further configured to:
- when the specific surface is a rectangular display surface of the 3D display device, configure the origin of the 3D spatial coordinate system at a diagonal intersection of the rectangular display surface, configure a first axis along a first side of the rectangular display surface, configure a second axis along a second side of the rectangular display surface and configure a third axis perpendicular to the rectangular display surface, wherein the first side is perpendicular to the second side; the second nodes are configured at the rectangular display surface; each of the second nodes has at least one symmetrical second node; and a symmetrical axis is at least one axis of the 3D spatial coordinate system.

15. The 3D interactive system according to claim 8, wherein the processing device further includes:
- a pre-correlation setting unit configured to, under a condition that the signal transmission devices transmit the position detection signals using different frequency domain channel resources, configure pre-correlations between the signal transmission devices and the corresponding channel resources; and
- a signal frequency identification unit configured to perform frequency identification and separation for the position detection signals received by the signal receiving devices, such that the signal transmission devices corresponding to the received position detection signals and the corresponding ending time points are determined.

16. The 3D interactive system according to claim 8, wherein the processing device further includes:
- a time slot determination unit configured to, under a condition that the signal transmission devices transmit the position detection signals using different time domain channel resources, determine the corresponding time slots based on the time domain channel resources utilized by the signal transmission devices; and
- a signal monitoring unit configured to, in the time slots, monitor arrival status of the position detection signals transmitted by the corresponding signal transmission devices, such that the corresponding ending time points are determined.

* * * * *